(12) United States Patent
Harrison et al.

(10) Patent No.: US 9,340,281 B2
(45) Date of Patent: May 17, 2016

(54) SUBMERGED VORTEX GENERATOR

(71) Applicant: The Boeing Company, Chicago, IL (US)

(72) Inventors: Neal A. Harrison, Lake Forest, CA (US); Mark Dehaan, Rancho Palos Verdes, CA (US); John C. Vassberg, Long Beach, CA (US); Anthony J. Sclafani, Alta Loma, CA (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 14/448,479

(22) Filed: Jul. 31, 2014

(65) Prior Publication Data

US 2016/0031550 A1     Feb. 4, 2016

(51) Int. Cl.
| | |
|---|---|
| *B64C 23/06* | (2006.01) |
| *B64C 1/00* | (2006.01) |
| *B64C 19/00* | (2006.01) |
| *B64C 21/02* | (2006.01) |
| *F15D 1/00* | (2006.01) |

(52) U.S. Cl.
CPC .............. *B64C 23/06* (2013.01); *B64C 1/0009* (2013.01); *B64C 19/00* (2013.01); *B64C 21/02* (2013.01); *F15D 1/0025* (2013.01); *B64C 2230/08* (2013.01); *B64C 2230/20* (2013.01); *B64C 2230/22* (2013.01); *B64C 2230/24* (2013.01)

(58) Field of Classification Search
CPC .............................. B64C 23/06; B64C 1/0009
See application file for complete search history.

(56) References Cited

U.S. PATENT DOCUMENTS

| | | | | |
|---|---|---|---|---|
| 3,744,745 A | * | 7/1973 | Kerker ................. | B64C 7/02 244/199.1 |
| 3,968,946 A | * | 7/1976 | Cole ................... | B64D 29/02 244/130 |
| 4,291,853 A | * | 9/1981 | Sigalla ................ | B64C 5/02 244/199.1 |
| 4,323,209 A | * | 4/1982 | Thompson ............ | B64C 23/06 244/199.1 |
| 4,540,143 A | * | 9/1985 | Wang .................. | B64C 7/02 244/130 |
| 4,643,376 A | * | 2/1987 | Vanderhoeven ...... | B64C 7/02 244/130 |
| 5,069,402 A | | 12/1991 | Wortman | |
| 5,156,362 A | * | 10/1992 | Leon ................... | B64C 23/06 244/130 |
| 5,598,990 A | * | 2/1997 | Farokhi ............... | B64C 23/06 244/198 |

(Continued)

FOREIGN PATENT DOCUMENTS

| | | | | |
|---|---|---|---|---|
| DE | 102009007325 | * | 8/2010 | ............. B64C 21/02 |
| DE | 102009007325 A1 | | 8/2010 | |
| FR | 2857439 A1 | | 1/2005 | |
| GB | 2173861 A | | 10/1986 | |
| WO | WO03013957 A1 | | 2/2003 | |

OTHER PUBLICATIONS

Wikipeida, "Boundary layer thickness", available at <http://en.wikipedia.org/wiki/Boundary_layer_thickness>, last visited Jul. 29, 2014.

(Continued)

*Primary Examiner* — Justin Benedik

(57) ABSTRACT

A vortex generator may include a depression in an aerodynamic surface, and a vortex generator leading edge located in the depression. The vortex generator leading edge may include a leading edge upper surface. The leading edge upper surface may be positioned at or below a tangent line defined at a location along the aerodynamic surface upstream of the depression relative to an oncoming local flow.

21 Claims, 19 Drawing Sheets

(56) References Cited

U.S. PATENT DOCUMENTS

| | | | | |
|---|---|---|---|---|
| 5,803,602 | A * | 9/1998 | Eroglu | B01F 5/0603 138/37 |
| 6,069,402 | A | 5/2000 | Murohara | |
| 6,126,118 | A * | 10/2000 | Fujino | B64C 7/02 244/130 |
| 6,363,972 | B1 * | 4/2002 | Umazume | B63B 1/36 138/177 |
| 6,964,397 | B2 * | 11/2005 | Konings | B64D 29/02 244/130 |
| 2009/0020652 | A1 * | 1/2009 | Rincker | B64C 23/06 244/204 |
| 2011/0132246 | A1 * | 6/2011 | Venables | B63B 39/06 114/126 |

OTHER PUBLICATIONS

M.M. Freestone "Vortex Generators for Control of Shock-Induced Separation, Part 1: Introduction and Aerodynamics", Transonic Aerodynamic, Fourth Draft. Nov. 1993.

M.M. Freestone "Vortex Generators for Control of Shock-Induced Separation, Part 2: Guide to Use of Vane Vortex Generators", Transonic Aerodynamic, Fourth Draft. Mar. 1994.

M.M. Freestone "Vortex Generators for Control of Shock-Induced Separation, Part 3: Examples of Applications of Vortex Generators to Aircraft", Transonic Aerodynamic, Fourth Draft. Nov. 1993.

Extended European Search Report dated Dec. 9, 2015.

Machine Translation of DE102009007325, dated Mar. 8, 2016.

* cited by examiner

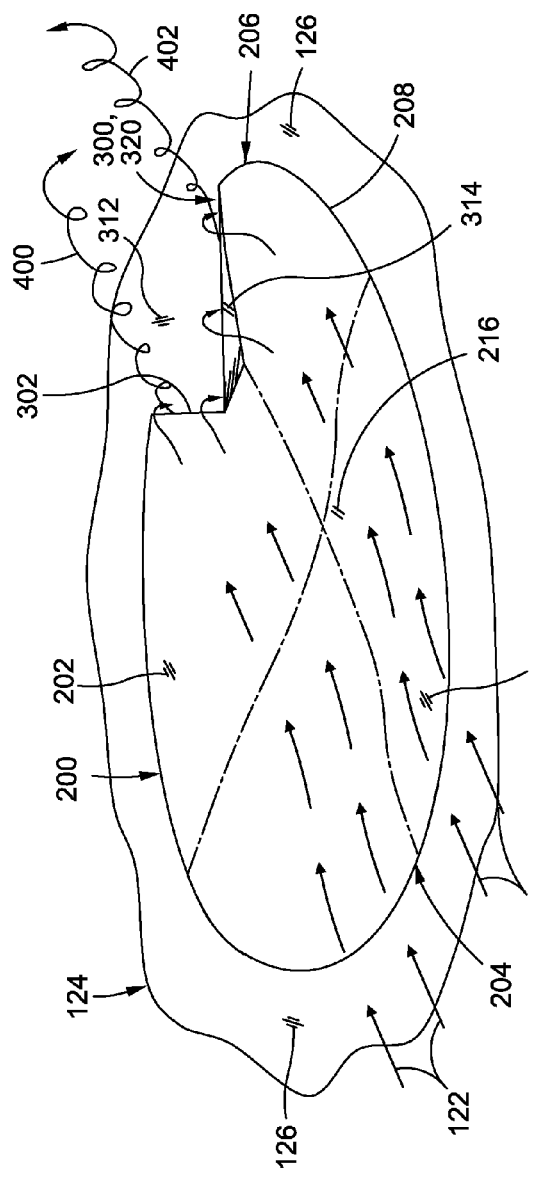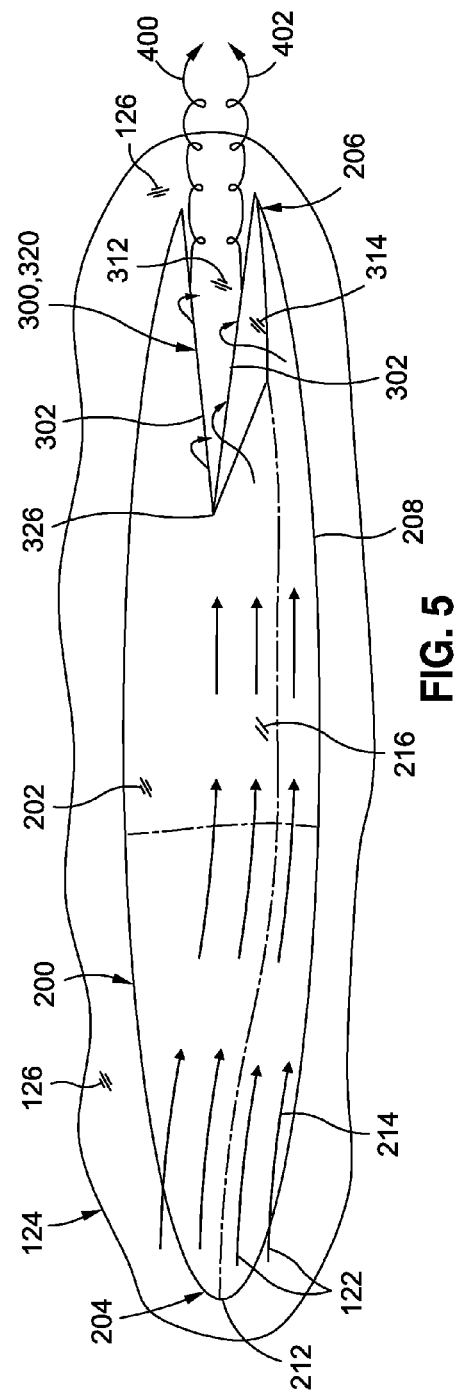

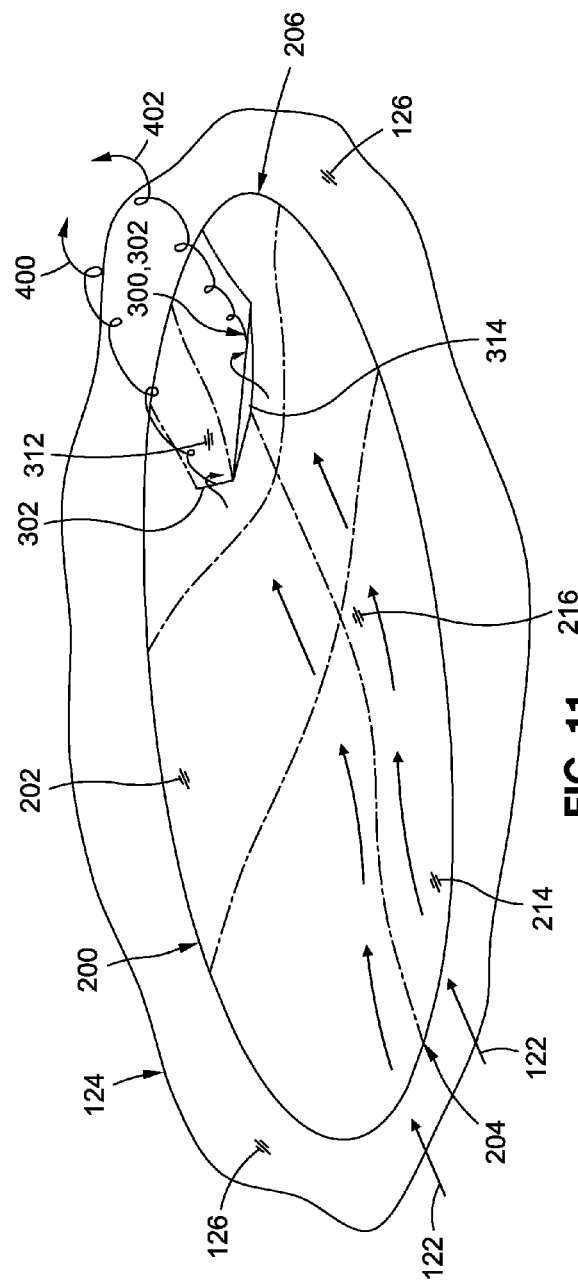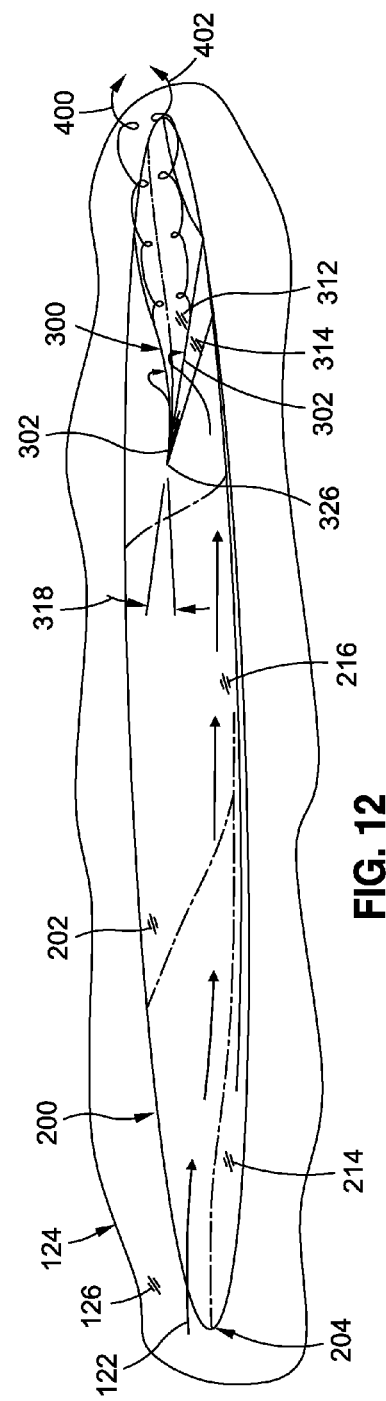

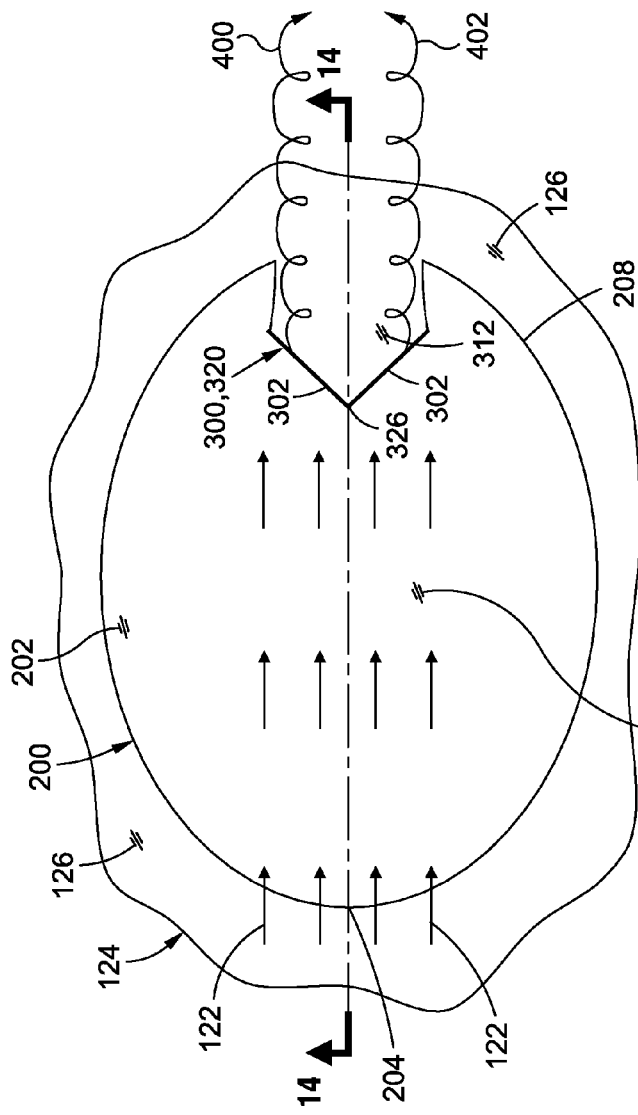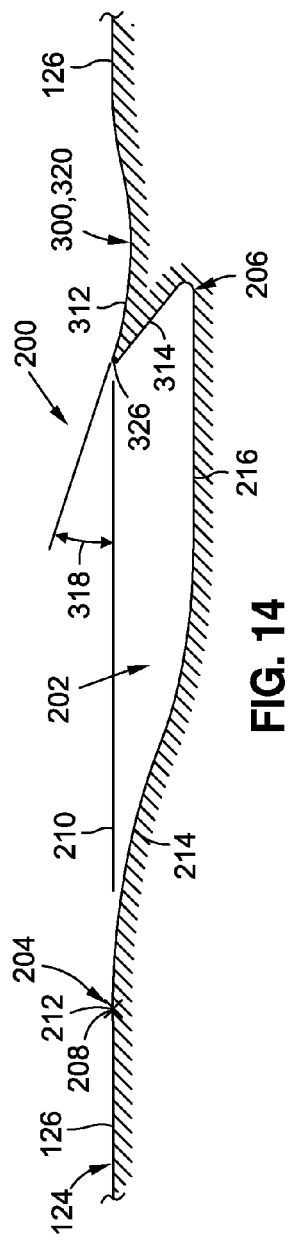
FIG. 13
FIG. 14

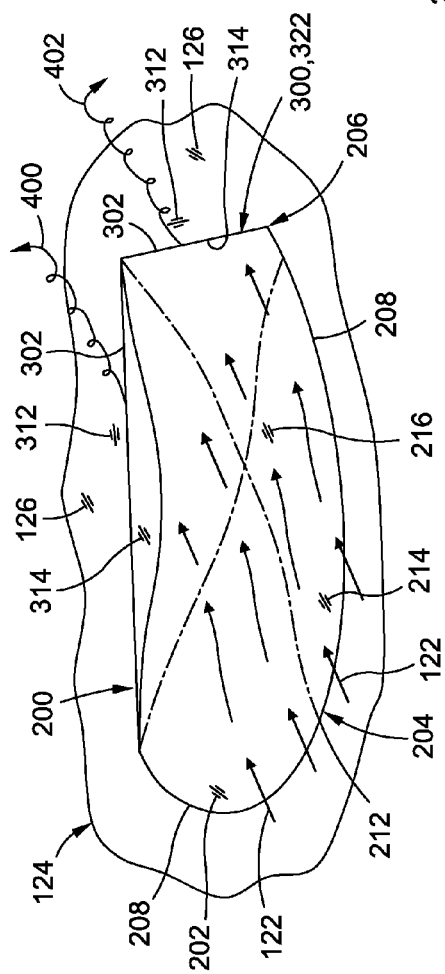
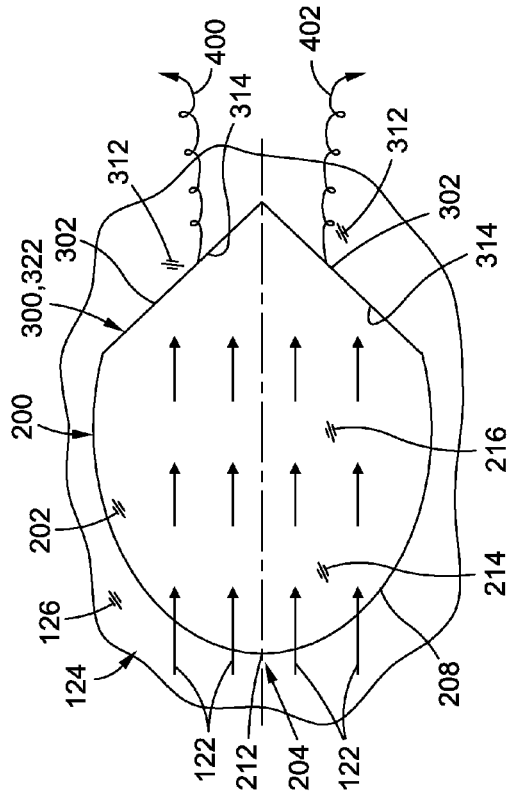

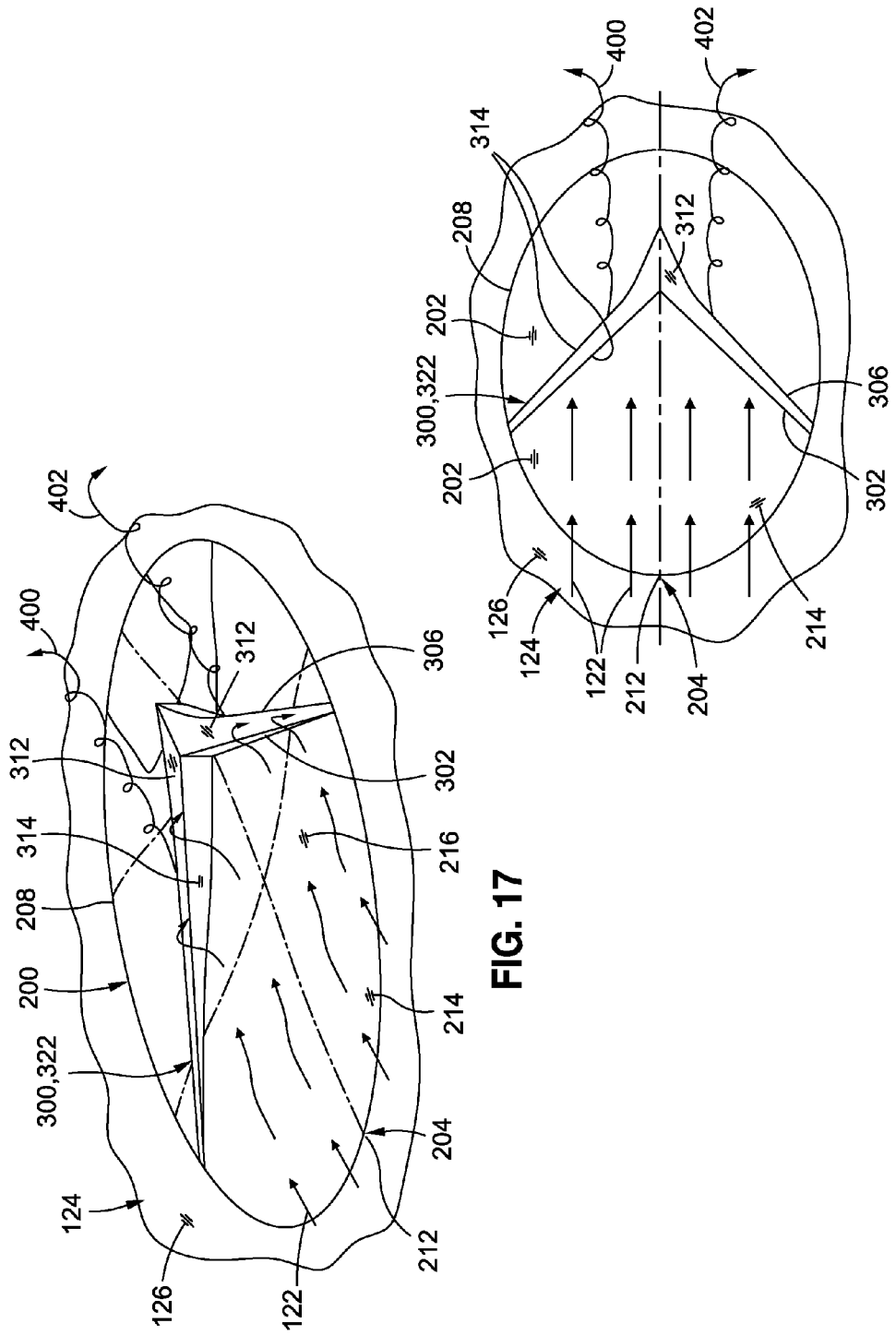

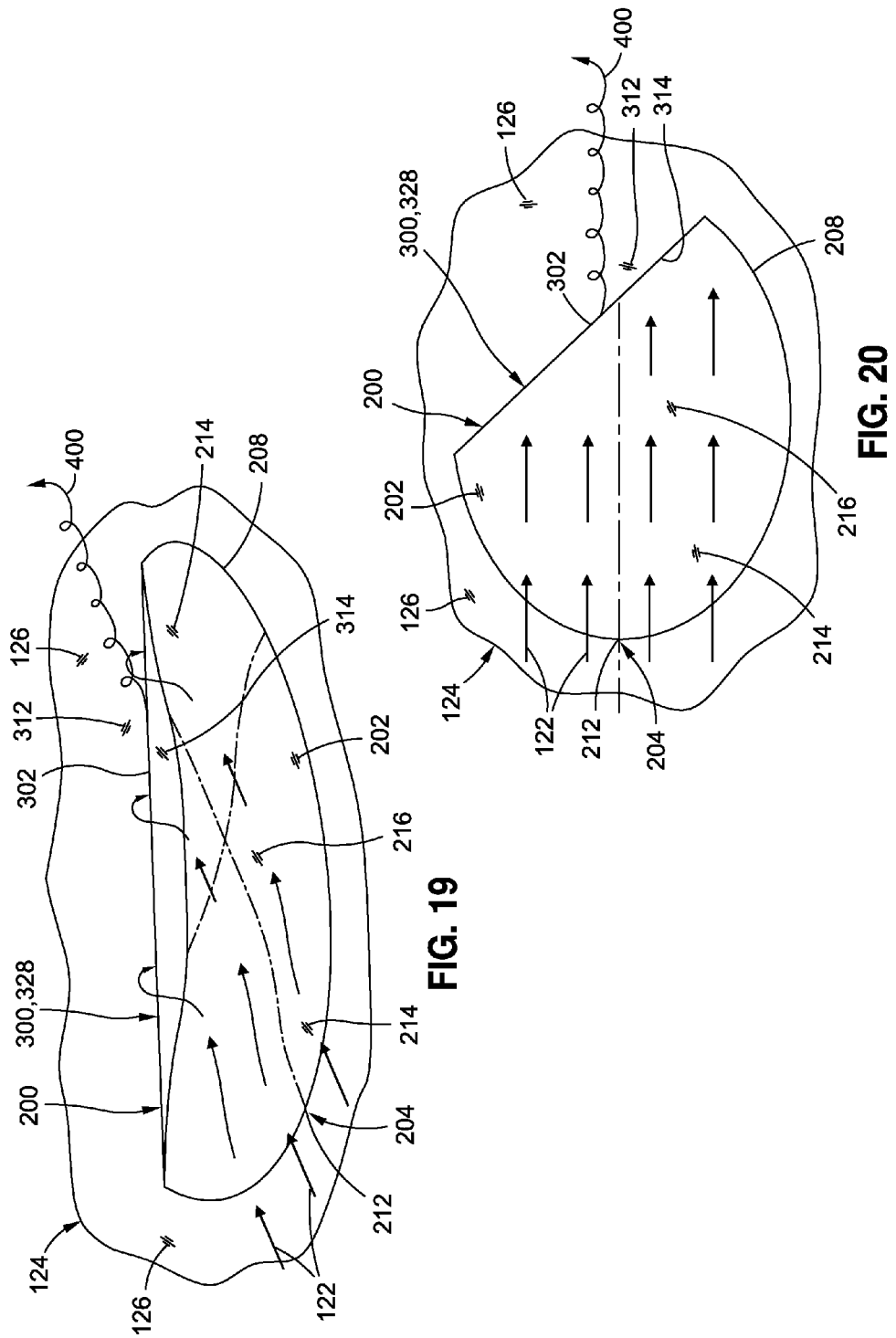

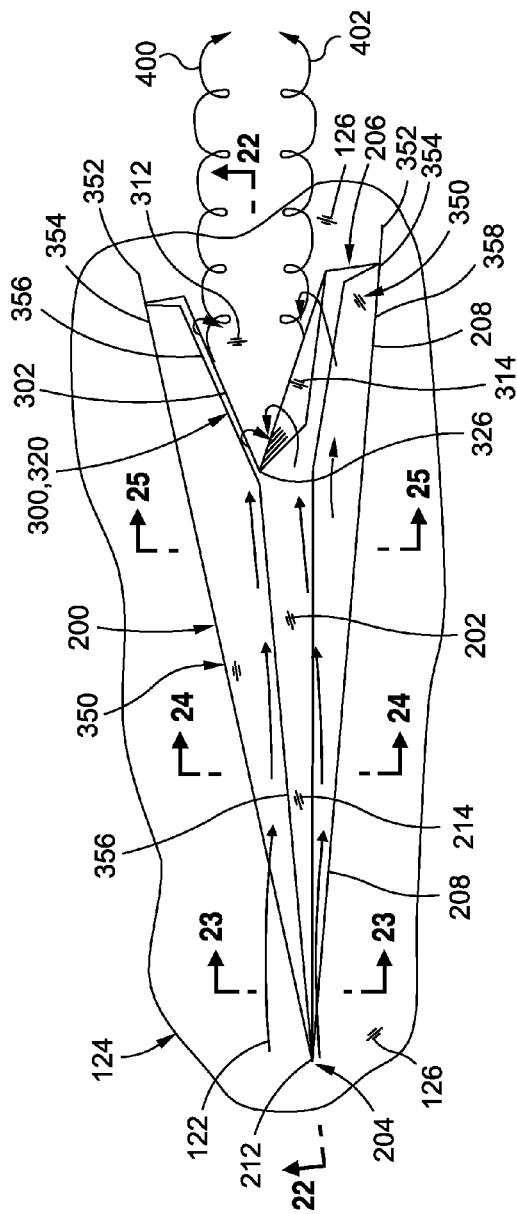
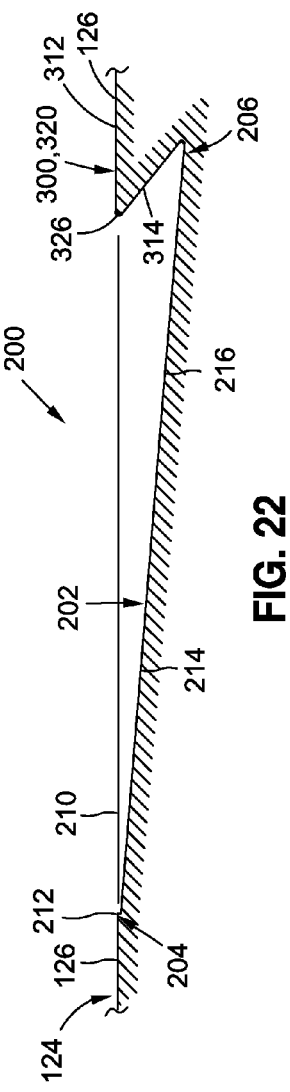

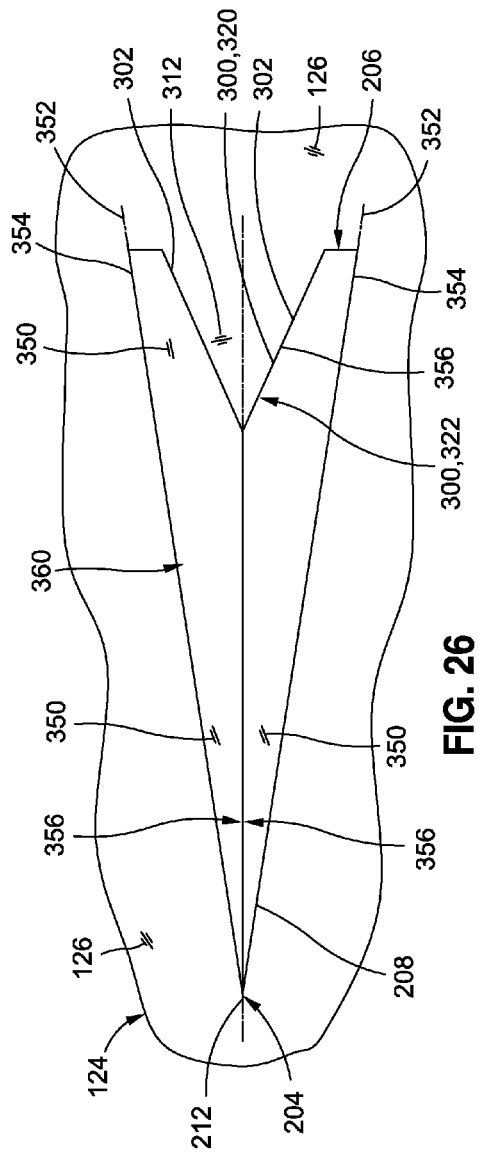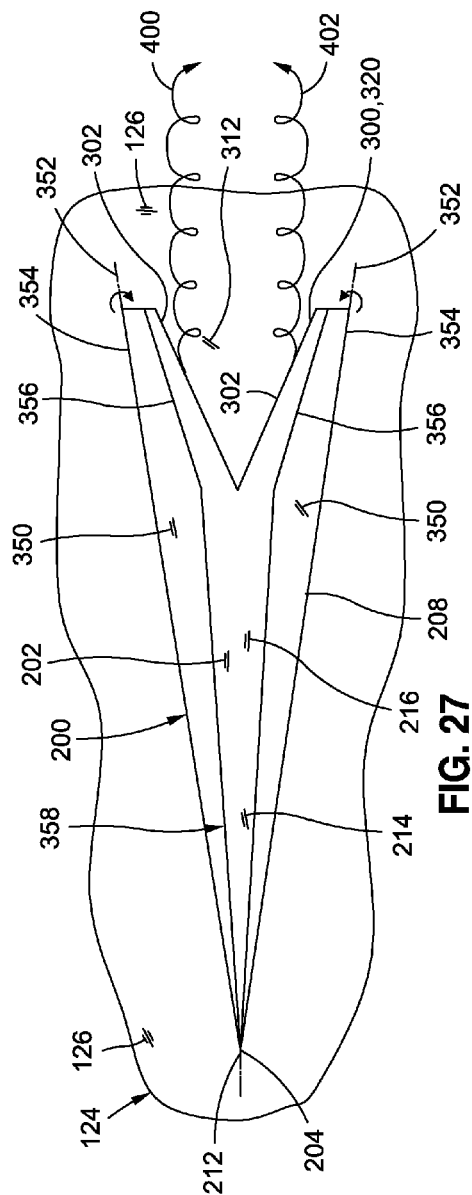

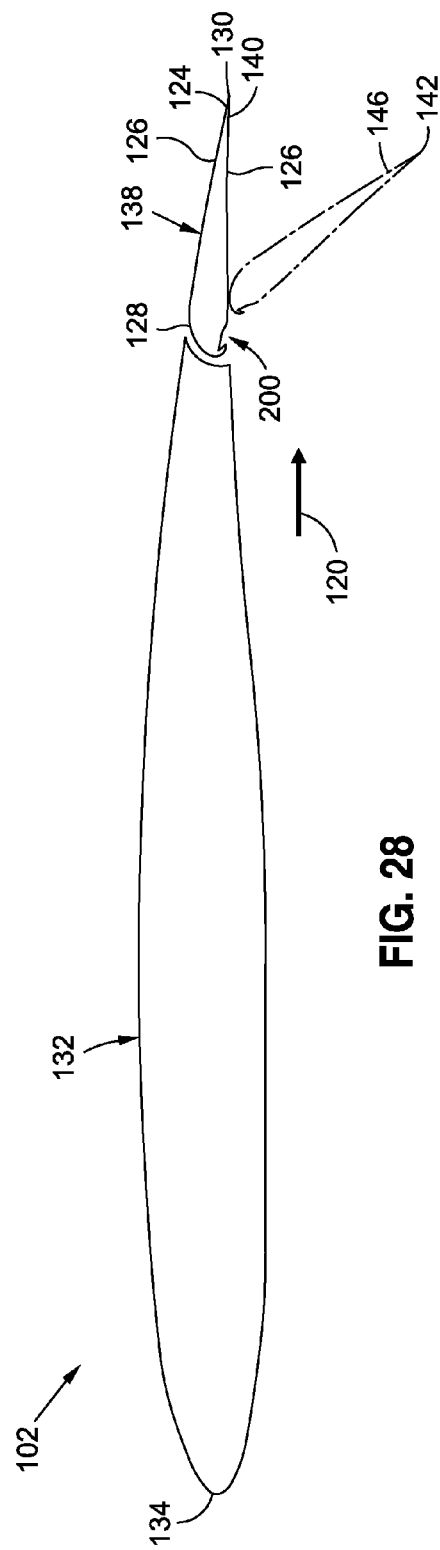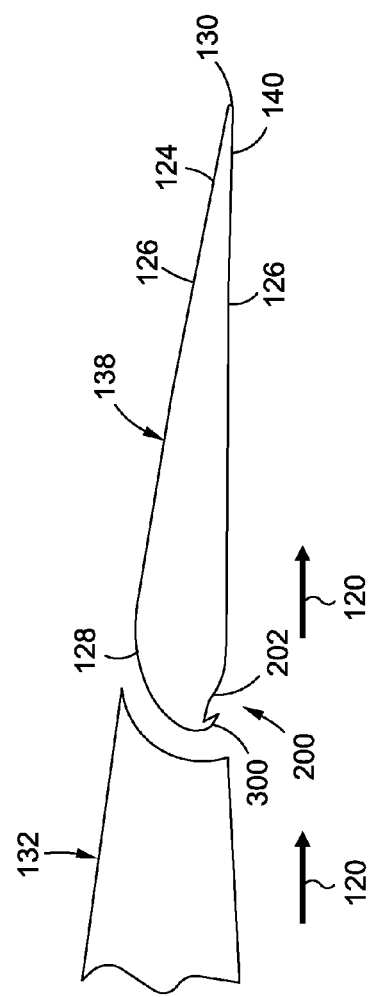

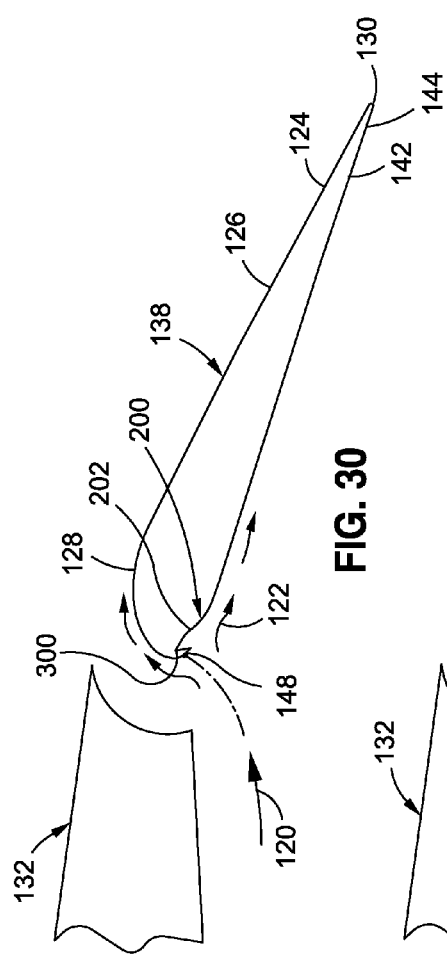
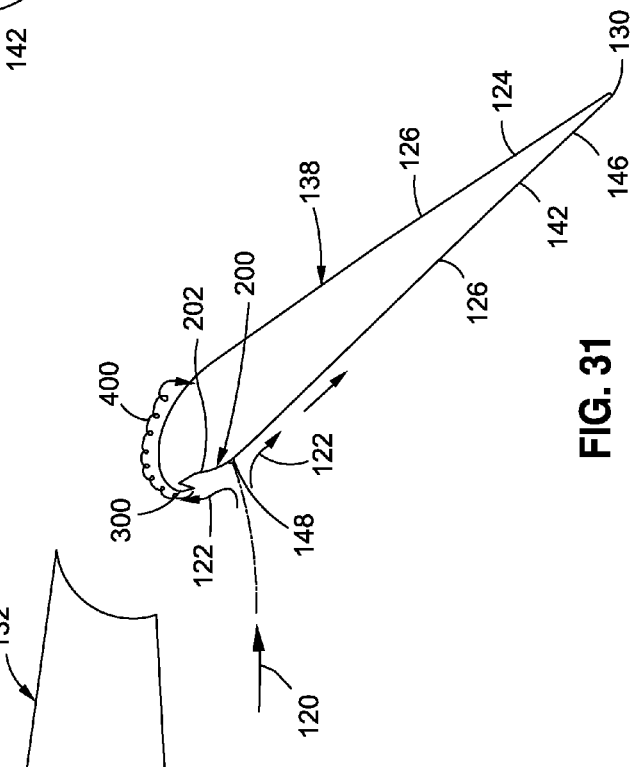

SUBMERGED VORTEX GENERATOR

FIELD

The present disclosure relates generally to devices for controlling the flow of a fluid medium and, more particularly, to vortex generators for generating vortices to improve the flow characteristics of a fluid medium.

BACKGROUND

Vortex generators are flow control devices that may improve the performance of a vehicle by generating vortices that passively energize low-energy areas of a fluid medium flowing over the vehicle. For example, vortex generators may be mounted on an aircraft to energize the boundary layer of local airflow over an aerodynamic surface and thereby reduce or eliminate the tendency of the downstream airflow to separate from the aerodynamic surface. By reducing or eliminating flow separation, vortex generators may improve the performance of an aircraft such as by reducing aerodynamic drag, increasing the aerodynamic buffet margin, and improving the handling qualities of the aircraft at high angles of attack. A reduction in aerodynamic drag may result in an improvement in the range, fuel efficiency, maximum speed, and high-lift (e.g., low speed) characteristics of the aircraft. Vortex generators may also improve performance by increasing aerodynamic lift at a given angle-of-attack or by maintaining lift with increasing angle-of-attack (i.e., delaying stall).

Unfortunately, existing designs for passive vortex generators may protrude above the outer mold line of an aircraft and therefore do not meet aircraft survivability constraints such as line-of-sight requirements. Line-of-sight requirements may necessitate that certain objects on an aircraft are hidden from view when the aircraft is observed from certain directions. Non-passive flow control devices such as active flow control systems may improve aerodynamic performance by suctioning a portion of the boundary layer through small perforations in an aerodynamic surface. Such active flow control systems may be integrated into the outer mold line of an aircraft and may therefore meet line-of-sight requirements. However, active flow control systems may add significant complexity and weight to an aircraft and may require continuous power to operate.

As can be seen, there exists a need in the art for a passive vortex generator that may improve vehicle performance while meeting line-of-sight requirements.

SUMMARY

The above-noted needs associated with vortex generators are specifically addressed by the present disclosure which provides a submerged vortex generator. The submerged vortex generator may include a depression in an aerodynamic surface. A vortex generator leading edge may be located in the depression. The vortex generator leading edge may include a leading edge upper surface. The leading edge upper surface may be positioned at or below a tangent line defined at a location along the aerodynamic surface upstream of the depression relative to an oncoming local flow.

Also disclosed is an aircraft including an aerodynamic body having an aerodynamic surface. A submerged vortex generator may be incorporated into the aerodynamic body. The submerged vortex generator may include a depression in the aerodynamic surface, and a vortex generator leading edge located in the depression. The vortex generator leading edge may include a leading edge upper surface positioned at or below a tangent line defined at a location along the aerodynamic surface upstream of the depression relative to a local flow.

Additionally disclosed is a method of generating vortices. The method may include moving an aerodynamic surface through a fluid medium. The aerodynamic surface may include a depression and a vortex generator leading edge located in the depression. An upper surface of the vortex generator leading edge may be positioned at or below a tangent line defined at a location along the aerodynamic surface upstream of the depression. The method may further include generating one more vortices in response to moving the aerodynamic surface through the fluid medium.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein;

FIG. 4 is a perspective view of an example of a submerged vortex generator taken along line 4 of FIG. 3 and illustrating a depression formed in an aerodynamic surface and a v-shaped vortex generator leading edge located in the depression;

FIG. 5 is a further perspective view of the submerged vortex generator of FIG. 4;

FIG. 11 is a perspective view of a further example of a submerged vortex generator including a vortex generator leading edge having a leading edge upper surface oriented at an angle of incidence relative to a tangent line;

FIG. 12 is a further perspective view of the submerged vortex generator of FIG. 11 and illustrating the angle of incidence of the leading edge upper surface;

FIG. 13 is a top view of the submerged vortex generator of FIGS. 11-12;

FIG. 14 is a side sectional view of the submerged vortex generator taken along line 14 of FIG. 13;

FIG. 15 is a perspective view of a further example of a submerged vortex generator including a vortex generator leading edge having a reversed v-shaped structure;

FIG. 16 is a top view of the submerged vortex generator of FIG. 15;

FIG. 17 is a perspective view of a further example of a submerged vortex generator including a vortex generator leading edge having a forward edge and an aft edge;

FIG. 18 is a top view of the submerged vortex generator of FIG. 17;

FIG. 19 is a perspective view of a further example of a submerged vortex generator including a vortex generator leading edge having a single edge structure;

FIG. 20 is a top view of the submerged vortex generator of FIG. 19;

FIG. 21 is a perspective view of a further example of a submerged vortex generator including an opposing pair of door panels movable between a first position (e.g., open position) in which the vortex generator leading edge is exposed to the oncoming local flow, and a second position (e.g., closed position) in which the door panels are generally flush or continuous with the aerodynamic surface as a means to conceal the depression and/or vortex generator leading edge;

FIG. 22 is a side sectional view of the submerged vortex generator of FIG. 21;

FIG. 26 is a top view of the submerged vortex generator of FIG. 21 with the door panels in the second position (e.g., closed position);

FIG. 27 is a top view of the submerged vortex generator of FIG. 21 with the door panels in the first position (e.g., open position);

FIG. 28 is a sectional view of a wing and a trailing edge flap taken along line 28 of FIG. 2;

FIG. 29 is a sectional view of the wing and trailing edge flap of FIG. 28 in a retracted position;

FIG. 30 is a sectional view of the wing and trailing edge flap of FIG. 28 in a takeoff position and illustrating the vortex generator located such that the flow attachment line is forward of the submerged vortex generator when the trailing edge flap is in the takeoff position;

FIG. 31 is a sectional view of the wing and trailing edge flap of FIG. 28 in a landing position and illustrating the vortex generator located such that the flow attachment line is aft of the submerged vortex generator when the trailing edge flap is in the landing position;

DETAILED DESCRIPTION

Figure 1:
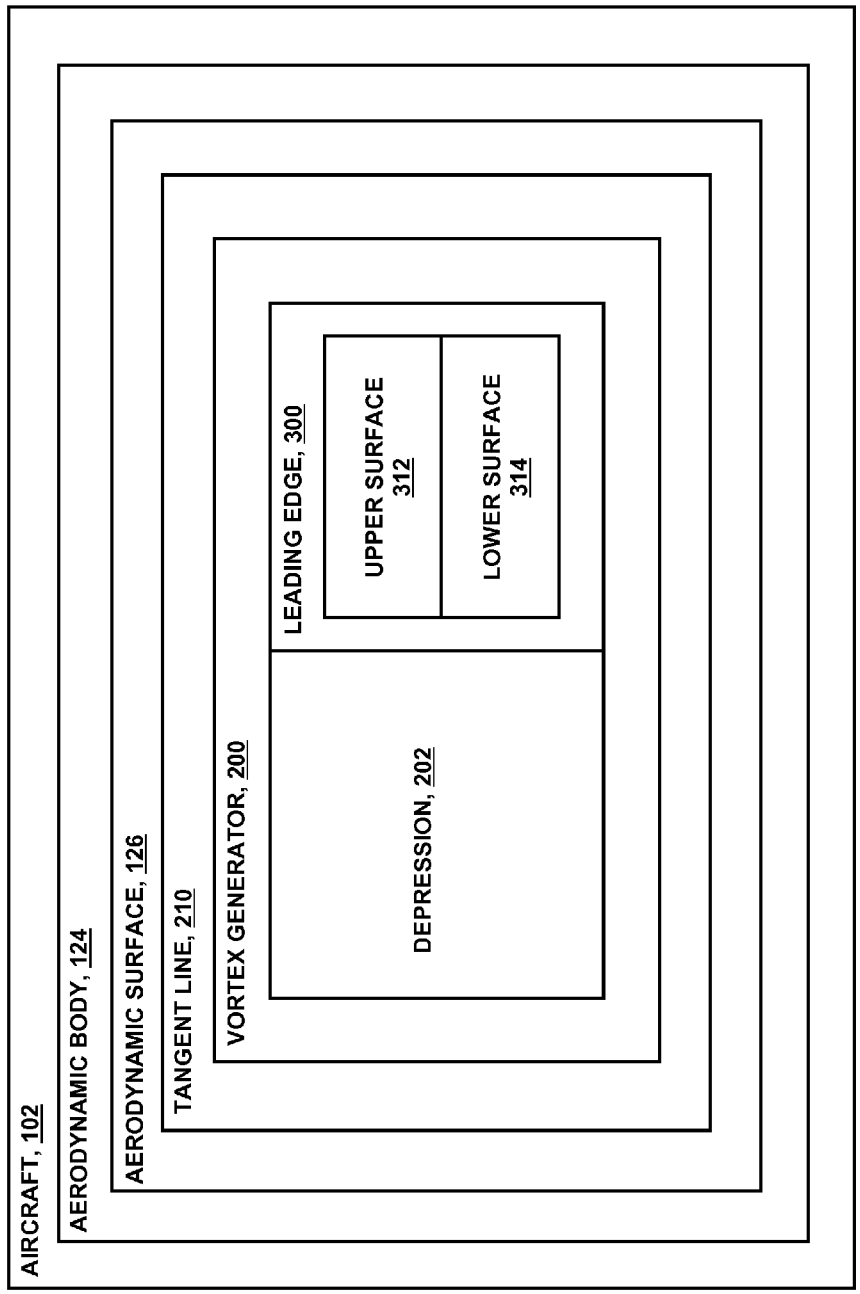
FIG. 1 is a block diagram of an aircraft including a submerged vortex generator.

Referring now to the drawings wherein the showings are for purposes of illustrating various examples of the disclosure, shown in FIG. 1 is a block diagram of an aircraft 102 having a submerged vortex generator 200 incorporated into an aerodynamic surface 126. The submerged vortex generator 200 may include a depression 202 formed in the aerodynamic surface 126. The submerged vortex generator 200 may further include a vortex generator leading edge 300 located in the depression 202. The vortex generator leading edge 300 may include a leading edge upper surface 312 and a leading edge lower surface 314. The leading edge upper surface 312 may be positioned at or below a tangent line 210 defined at a location along the aerodynamic surface 126 upstream of the depression 202 relative to an oncoming local flow 122 (e.g., a boundary layer flow) of a fluid medium. The tangent line 210 may be tangent to the aerodynamic surface 126 in which the depression 202 is formed. The tangent line 210 may be tangent to the aerodynamic surface 126 at a forward-most location 326 of a perimeter edge of the depression 202 relative to the oncoming local flow 122 of the fluid medium.

In examples where the depression 202 is formed in a curved or contoured surface such as a convex surface (e.g., see FIGS. 3 and 31) or a concave surface (not shown), the leading edge upper surface 312 may be positioned at or below an imaginary surface or line representing an outer mold line of the aerodynamic surface 126 prior to incorporation of the depression 202 into the aerodynamic surface 126. In the examples illustrated in the figures, the vortex generator leading edge 300 may be configured such that no part of the leading edge upper surface 312 protrudes above the tangent line 210. However, in other examples not shown, one or more portions of the vortex generator leading edge 300 may protrude above the tangent line 210.

One or more submerged vortex generators 200 may be located upstream of an area of an aerodynamic surface 126 that may be susceptible to flow separation or flow reversal. Each submerged vortex generator 200 may generate a vortex 400 or multiple vortices 400 to change the flow properties of the flow downstream of the submerged vortex generator 200. The vortex 400 or vortices 400 generated by a submerged vortex generator 200 may be described as a concentrated, high-velocity tube of air that may energize a relatively low-energy or low-momentum flow (e.g., the boundary layer flow or local flow 122—e.g., see FIG. 3) by mixing high-momentum flow (e.g., a freestream flow 120—e.g., see FIG. 2) with the low-momentum flow thereby allowing the low-momentum flow to negotiate pressure gradients that would otherwise cause flow separation. As indicated above, avoiding or eliminating flow separation may result in an improvement in the performance of an aircraft or other vehicle or structure on which the submerged vortex generators 200 is implemented. In the case of an aircraft, improvements in performance may include a reduction in aerodynamic drag, an increase in aerodynamic lift, and/or an increase in maximum lift coefficient.

One or more submerged vortex generators 200 may be implemented in any one of a variety of different structures including vehicular structures and non-vehicular structures. In this regard, one or more submerged vortex generators 200 may be implemented on any type of marine vessel where the fluid medium is water. Submerged vortex generators 200 may also be implemented on any type of land vehicle or air vehicle such as an aircraft 102 where the fluid medium is air. Implementation of submerged vortex generators 200 on a vehicle 100 is not limited to aircraft 102, and may extend to any type of vehicle 100 that moves through any type of fluid medium, without limitation. For air vehicles such as fixed-wing aircraft or rotary-wing aircraft, one or more submerged vortex generators 200 may be implemented on any aerodynamic body 124 of the aircraft 102 to reduce or eliminate flow separation. For fixed-wing aircraft 102, one or more submerged vortex generators 200 may be implemented on the wings 132, control surfaces, or any other type of aerodynamic body 124 of the aircraft 102.

Figure 2:
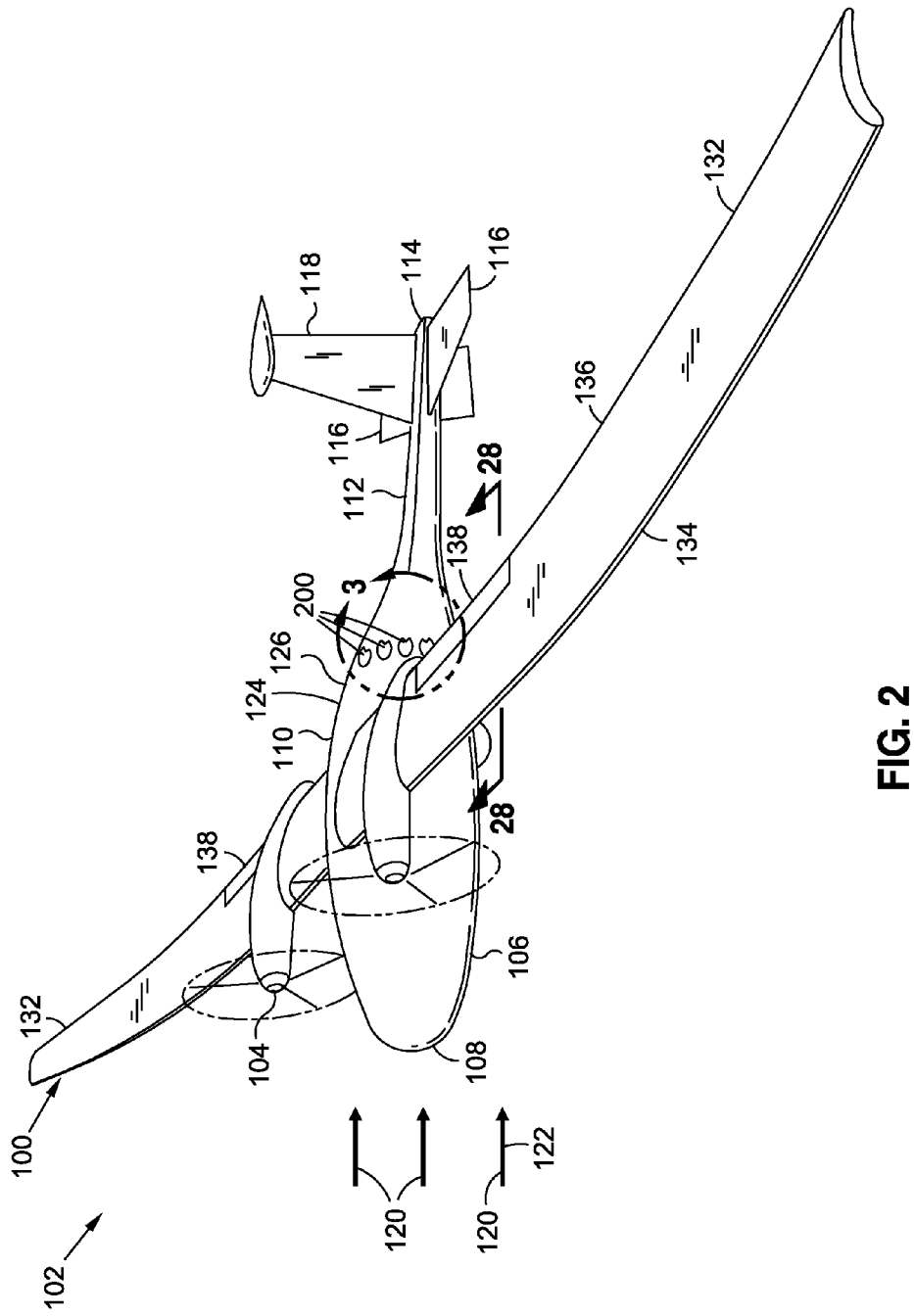
FIG. 2 is a perspective view of an aircraft including a plurality of submerged vortex generators integrated into a fuselage.

FIG. 2 shows a fixed-wing aircraft 102 incorporating a plurality of submerged vortex generators 200 on an aft body 110 of the fuselage 106. The aircraft 102 may include a pair of wings 132 each having a wing leading edge 134 and a wing trailing edge 136. One or more propulsion units 104 may be mounted to the wings 132. The fuselage 106 may extend from a nose 108 to an empennage 114. The empennage 114 may include a horizontal tail 116 and a vertical tail 118 for directional control of the aircraft 102. During flight, the aircraft 102 may move through an oncoming freestream flow 120.

Figure 3:
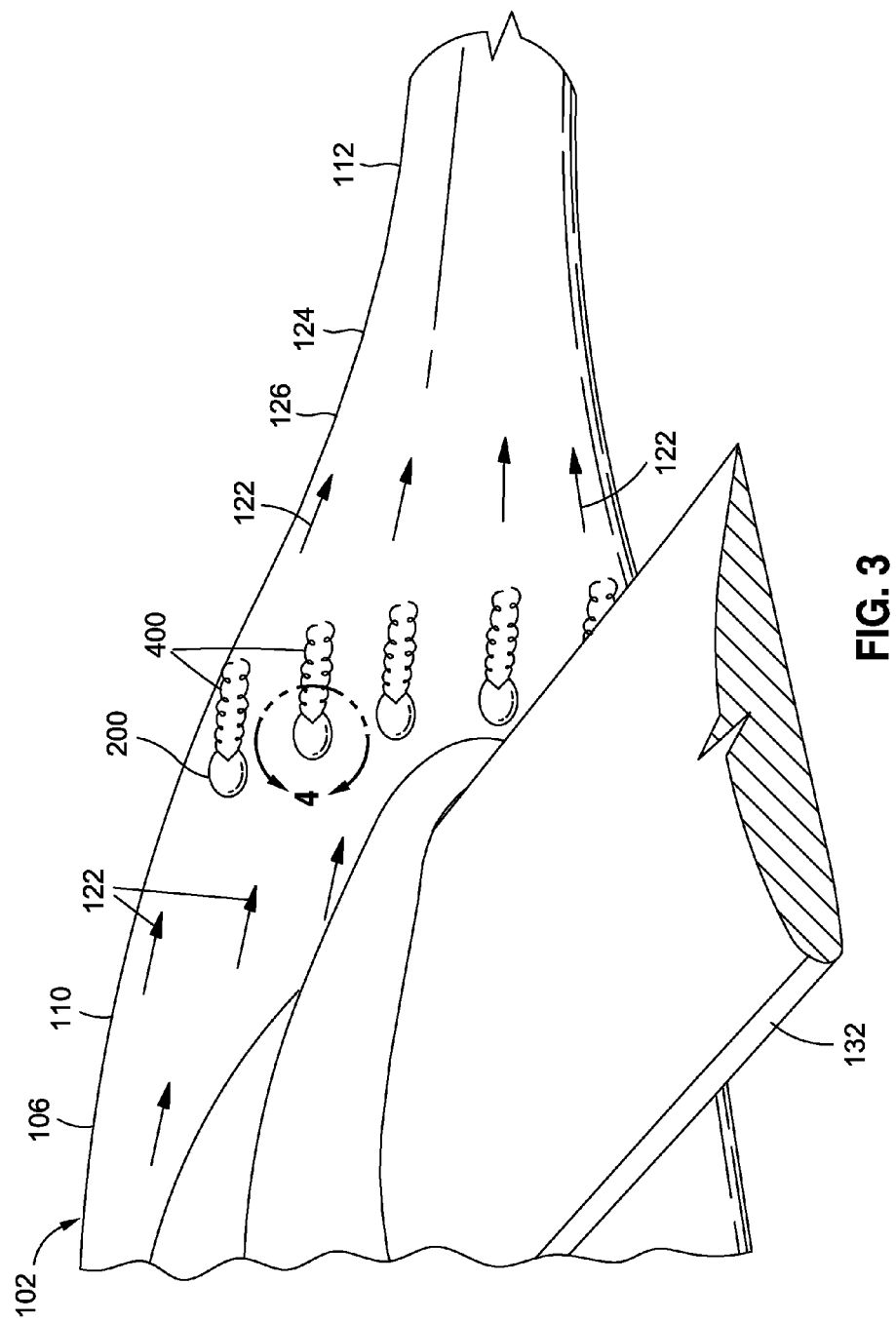
FIG. 3 is a perspective view of an aft body and tail boom of the fuselage taken along line 3 of FIG. 2 and illustrating the plurality of vortex generators generating vortices.

In FIG. 3, shown is the fuselage 106 including the aft body 110 which may taper down over a relatively short distance to a relatively small-diameter tail boom 112. The fuselage 106 may include a plurality of submerged vortex generators 200 which may be implemented at a location generally upstream of the taper such as on the aft body 110. The submerged vortex generators 200 may generate vortices 400 that may energize the downstream local flow 122 over the fuselage 106, and thereby reduce or avoid downstream flow separation that may otherwise occur due to the taper. By integrating the vortex generator leading edge 300 at or below a tangent line 210 or imaginary outer mold line (not shown) of the aerodynamic surface 126 such that substantially no portions of the submerged vortex generator 200 protrude above the imaginary outer mold line, the presence of the submerged vortex generators 200 may be disguised from line-of-sight observances. For example, the submerged vortex generator 200 may be configured such that the depression 202, the vortex generator leading edge 300, and/or any other portion of the submerged vortex generator 200 may be hidden from view when the aircraft 102 is observed from the side, front, rear, below, and/or when viewed from other directions. In this regard, the implementation of a submerged vortex generator 200 on an aerodynamic body 124 may include mounting a vortex generator leading edge 300 onto an aerodynamic surface 126 and then adding bumps or ridges (not shown) along the sides of the vortex generator leading edge 300 to form the depression 202 and obscure the vortex generator leading edge 300 when the aerodynamic body 124 is viewed from certain directions.

One or more submerged vortex generators 200 may be incorporated into any location on an aircraft 102. For example, although not shown, one or more submerged vortex generators 200 may be located on an upper surface of a wing leading edge 134 to improve the flow characteristics of airflow over the wing 132. An array of submerged vortex generators 200 may be located on the upper surface of the wing leading edge 134 to maintain airflow over the wing 132 at high angles of attack and/or to favorably affect the airflow over the wing 132 at high speeds to reduce or avoid the onset of buffeting. Submerged vortex generator 200 may also be incorporated into one or more control surfaces of an aircraft 102. For example, one or more submerged vortex generators 200 may be implemented on a trailing edge device of a wing 132. As described below, FIGS. 28-33 illustrate a submerged vortex generator 200 installed on a trailing edge flap 138 to improve flow characteristics over the trailing edge flap 138 when deployed at relatively deep flap settings such as a landing flap setting. Although not shown, one or more of the disclosed examples of the submerged vortex generator 200 may also be implemented on a leading edge of a nacelle (not shown) of an engine inlet as a means to delay or avoid the separation of air flow into the nacelle at high angles of attack. Although the disclosed examples are described in the context of a tube-and-wing aircraft 102 as shown in FIG. 2, one or more submerged vortex generators 200 may be implemented in any aircraft configuration, without limitation, including a blended wing configuration, a hybrid wing-body configuration, and other aircraft configurations.

FIGS. 4-5 show an example of a submerged vortex generator 200 including a depression 202 formed in an aerodynamic surface 126. The depression 202 may have a forward portion 204 and an aft portion 206 relative to local flow 122 which may be moving along the aerodynamic surface 126 in an oncoming local flow 122 direction. The vortex generator leading edge 300 may be located in the depression 202 toward an aft portion 206 of the depression 202. In the example shown, the vortex generator leading edge 300 has a v-shaped structure 320 which may be oriented or aligned with the local flow 122. In the example shown, the submerged vortex generator 200 has a symmetrical configuration about a longitudinal centerline which may be oriented parallel to the local flow 122 direction. However, for any one of the submerged vortex generator 200 examples disclosed herein, the depression 202 and/or the vortex generator leading edge 300 may be provided in an asymmetric configuration.

The depression 202 may be shaped and configured to allow the oncoming local flow 122 to approach the vortex generator leading edge 300 with little reduction in the speed of the local flow 122. As indicated above, the depression 202 is preferably shaped and configured such that the local flow 122 enters the depression 202 with substantially no flow separation at a location forward of the vortex generator leading edge 300. In this regard, a forward portion 204 of the depression 202 may include a depression transition section 214 that may form a smooth, continuous transition from the aerodynamic surface 126 upstream of the depression 202 into the depression base 216. The smooth, continuous, depression transition section 214 may be shaped and configured to avoid kinks, gaps, steps, protrusions, and any other type of discontinuity or abrupt change in curvature that may disrupt the local flow 122 into the depression 202.

The depression 202 may include a depression perimeter 208. The depression transition section 214 may be tangent to and continuous with the aerodynamic surface 126 at one or more locations around the depression perimeter 208 such as at the forward portion 204 of the depression 202. The side portions of the depression 202 along the depression perimeter 208 may also form a smoothly curved depression transition section 214 from the aerodynamic surface 126 into the depression base 216. In this regard, the depression 202 may be configured such that laminar local flow 122 remains substantially laminar within the depression 202.

Figure 6:
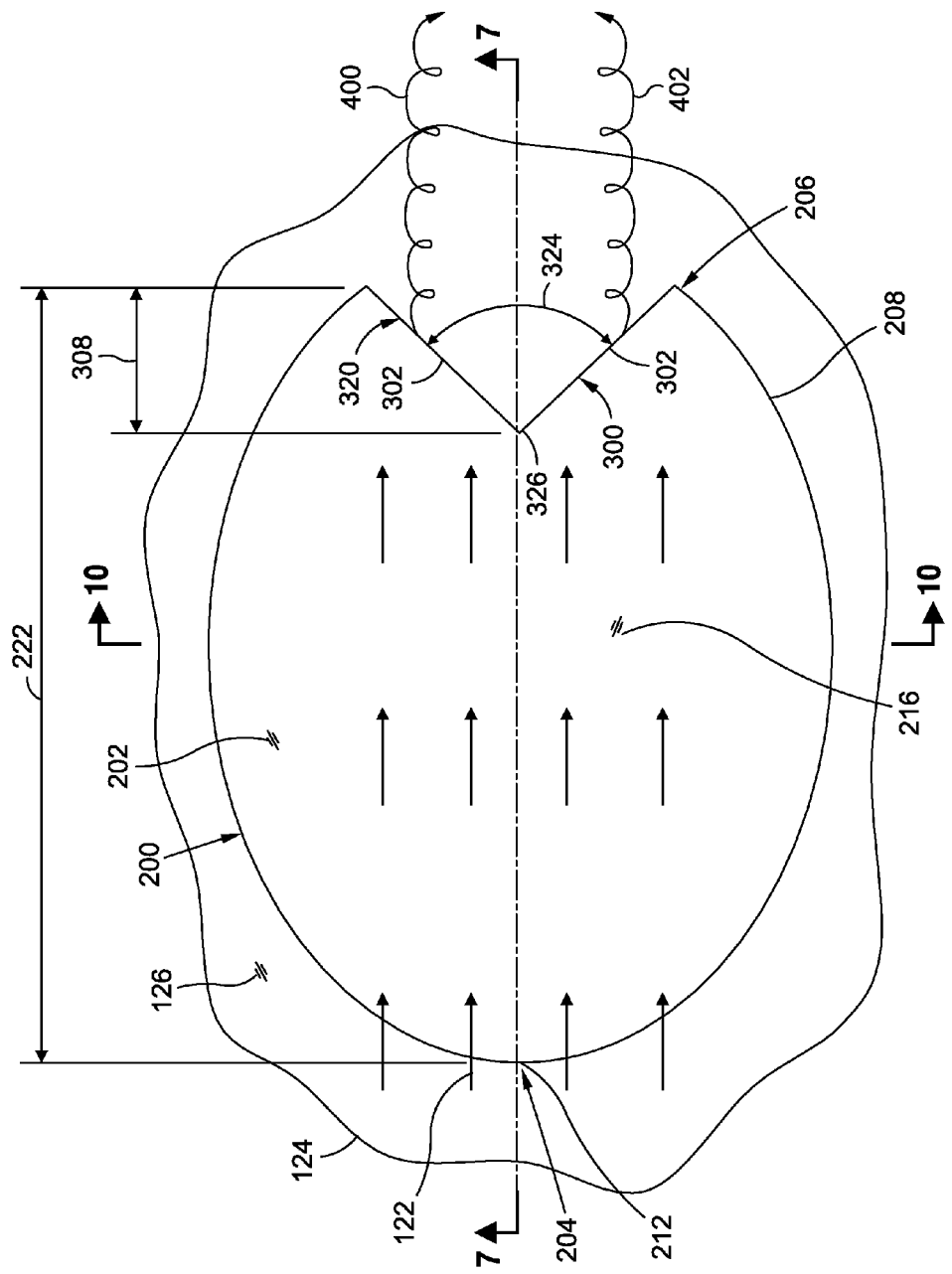
FIG. 6 is a top view of the submerged vortex generator of FIG. 4.

FIG. 6 is a top view of a submerged vortex generator 200. The depression 202 has a depression length 222 defined relative to the local flow 122 direction. The vortex generator leading edge 300 has a leading edge length 308. In some example, the depression length 222 may be in the range of from approximately 2-10 times the leading edge length 308, although the depression 202 may be provided in lengths outside the range of 2-10 times the leading edge length 308. As indicated above, the depression 202 is preferably sized and configured to allow the oncoming local flow 122 to enter the depression 202 in a manner avoiding a loss in velocity of the local flow 122 and avoiding flow separation within the depression 202 at least at a location immediately forward of the vortex generator leading edge 300.

In FIG. 6, the vortex generator leading edge 300 has a v-shaped structure 320 when viewed along a direction normal to the leading edge upper surface 312. The v-shaped structure 320 may be defined by a pair of forward edges 302 of the vortex generator leading edge 300. The forward edges 302 may converge at an apex at a forward-most location 326 of the vortex generator leading edge 300. However, in some examples not shown, the v-shaped structure 320 may be rounded at a forward-most location 326 of the vortex generator leading edge 300. In the example shown, each one of the forward edges 302 may be generally straight. In other examples, one or more of the forward edges 302 may include a non-straight section or a slightly curved section, or the forward edge 302 may include two or more straight sections oriented at a slight angle relative to one another.

One or more of the forward edges 302 of the vortex generator leading edge 300 may be oriented at an angle relative to an oncoming local flow 122 when viewed along a direction normal to the leading edge upper surface 312. For example, in FIG. 6, the forward edges 302 of the v-shaped structure 320 vortex generator leading edge 300 may define a sweep angle 324 (FIG. 6) of between approximately 30-180 degrees. In the example shown, the v-shaped structure 320 of the vortex generator leading edge 300 may be generally highly swept, and may be based on a delta-wing oriented at an angle of attack relative to the oncoming local flow 122. The vortex generator leading edge 300 is submerged within the local flow 122 which possesses sufficient energy to produce relatively strong and stable counter-rotating vortices 402 as a result of the local flow 122 passing over the pair of forward edges 302. In any one of the examples disclosed herein, vortices 400 may continuously form along a forward edge 302 as the local flow 122 wraps around or curls over the forward edge 302. The vortices 400 may emerge from any location along a forward edge 302, and are not limited to emerging from the locations shown in the figures. In some examples, the vortex generator leading edge 300 may be a separate component that is attached, mounted, or secured to the depression 202. In other examples, the vortex generator leading edge 300 may be integrally formed with the depression 202 and/or the portion of the aerodynamic surface 126 located generally aft of the depression 202.

Figure 7:
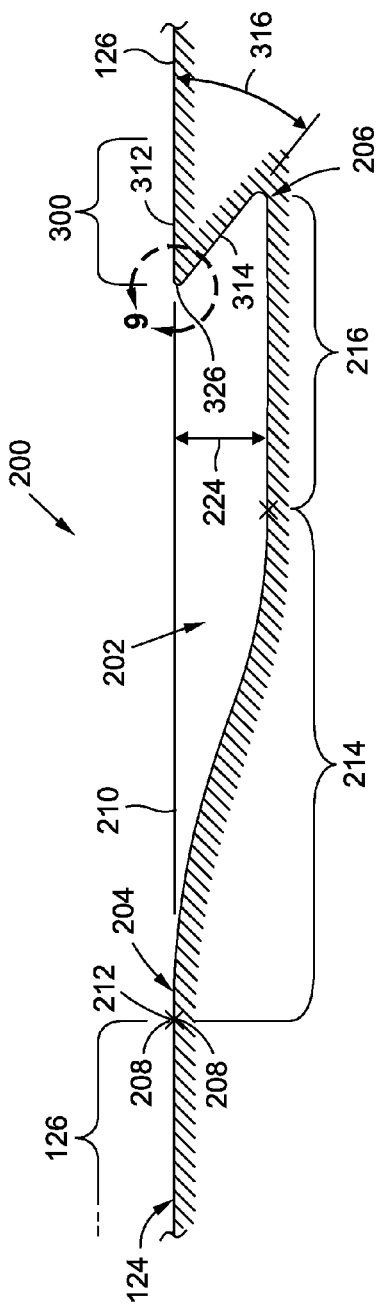
FIG. 7 is a side sectional view of the submerged vortex generator taken along line 7 of FIG. 6 and illustrating the leading edge upper surface positioned at or below a tangent line of the aerodynamic surface upstream of the depression.

FIG. 7 is a side sectional view of a submerged vortex generator 200 showing the leading edge upper surface 312 positioned at or below the tangent line 210 of the aerodynamic surface 126 upstream of the depression 202. The leading edge upper surface 312 may be continuous with the aerodynamic surface 126 aft of the vortex generator leading edge 300. In this regard, the leading edge upper surface 312 may form a continuation of the outer mold line of the aerodynamic surface 126. The depression 202 may have a depression depth 224 measured as the distance between the depression base 216 to the tangent line 210, or the distance between the depression base 216 and an imaginary outer mold line representing the outer mold line of the aerodynamic surface 126 prior to incorporation of the depression 202 into the aerodynamic surface 126. The depression depth 224 may be measured at a forward-most location of the vortex generator leading edge 300.

In some examples, the depression 202 may have a depression depth 224 of between approximately 1-5 times a boundary layer displacement thickness. In the present disclosure, the boundary layer displacement thickness may be defined at the location of the submerged vortex generator 200 such as at a forward-most location of the vortex generator leading edge 300. The depression 202 may have a depression depth 224 of greater than 5 times the boundary layer displacement thickness. In general, as the ratio of vortex generator leading edge 300 height (e.g., depression depth 224) to boundary layer displacement thickness increases, dynamic pressure on the vortex generator leading edge 300 may also increase, which may result in an increase in the strength of the generated vortices 400. However, an excessively large ratio of vortex generator leading edge 300 height to boundary layer displacement thickness may result in the submerged vortex generator 200 generating more aerodynamic drag than it may otherwise prevent, and/or may result in the bursting of the generated vortices 400 which may decrease the effectiveness of such vortices 400. In some examples, the leading edge upper surface 312 may extend up to approximately 5 times the boundary layer displacement thickness above the depression base 216, which may result in the submerged vortex generator 200 generating relatively strong vortices without generating excessive aerodynamic drag.

In FIG. 7, the depression 202 may have an aspect ratio of depression length 222 to depression depth 224 in the range of from between approximately 1:1 and 25:1. However, aspect ratios of greater than 25:1 are contemplated for the depression 202. For example, the depression length may theoretically extend any portion of the length of a vehicle or along the entire length of the vehicle. As indicated above, any one of the submerged vortex generator 200 examples disclosed herein may be configured to meet line-of-sight requirements such that the depression 200, the vortex generator leading edge 300, and/or any other portion of the submerged vortex generator 200 may be hidden from view when the aircraft 102 is observed from the side, front, rear, below, and/or other directions. In one example, the depression 202 may have an aspect ratio of between approximately 2:1 and 10:1. The size of the depression length 222 may be based upon the distance required to smoothly transition the local flow 122 into the depression 202 and avoid flow separation within the depression 202. Flow separation may undesirably decrease the angle of attack of the local flow 122 relative to the vortex generator leading edge 300. A decreased angle of attack of the local flow 122 relative to the vortex generator leading edge 300 may reduce the effectiveness of the vortex generator leading edge 300 in generating vortices 400. In addition, flow separation within the depression 202 may result in increased aerodynamic drag generated by the submerged vortex generator 200 relative to the aerodynamic drag generated by non-separated flow.

Also shown in FIG. 7 is the depression transition section 214 which may be tangent to and continuous with the aerodynamic surface 126 at a tangent point 212 located at the depression perimeter 208 at the forward portion 204 of the depression 202. The submerged vortex generator 200 of the present disclosure may also be defined with regard to an included angle 316 between the leading edge upper surface 312 and the leading edge lower surface 314 at the forward-most location 326 on the vortex generator leading edge 300 when the vortex generator leading edge 300 is viewed in side cross-section. In some examples, the included angle 316 may be less than 90 degrees. For example, the included angle 316 may be in the range of from approximately 30-60 degrees.

Figure 8:
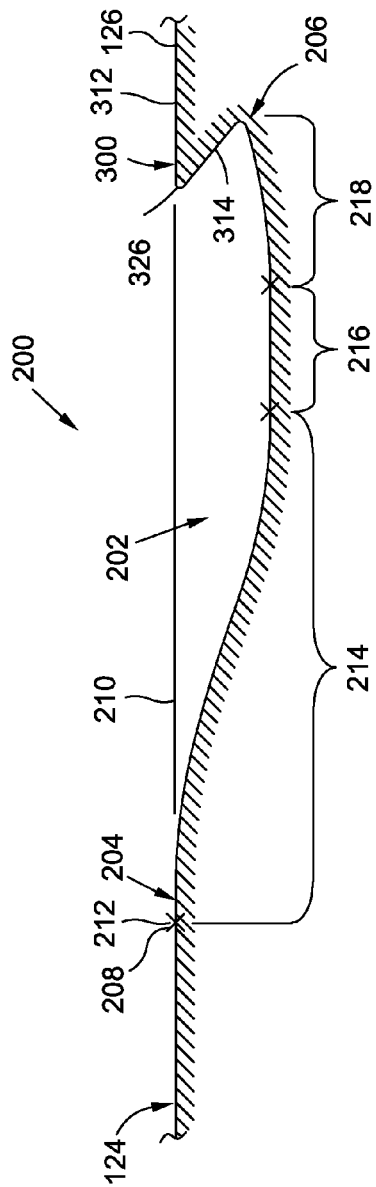
FIG. 8 is a side sectional view of a further example of a submerged vortex generator including a depression ramp for guiding the local flow upwardly toward the vortex generator leading edge.

FIG. 8 is a side sectional view of a further example of a submerged vortex generator 200. The depression 202 includes a depression ramp 218 which may guide the local flow 122 upwardly toward the vortex generator leading edge 300. The depression ramp 218 may be part of the depression transition section 214 at the aft portion 206 of the depression 202. The depression ramp 218 may provide a relatively smooth transition between the depression base 216 and the aerodynamic surface 126 aft. In this regard, the depression ramp 218 may be shaped similar to the transition section 214 at the forward portion 204 of the depression 202.

Figure 9:
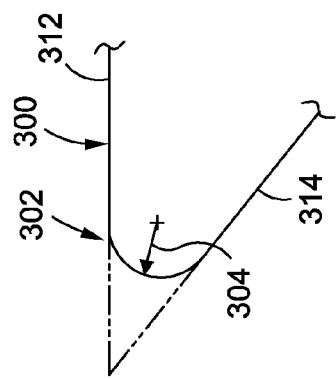
FIG. 9 is a side sectional view of an example of a rounded forward edge of a vortex generator leading edge.

FIG. 9 is a side sectional view of an example of a forward edge 302 of a vortex generator leading edge 300 as may be included in any of the submerged vortex generator 200 configurations disclosed herein. In some examples, the forward edge 302 may be rounded and may have a radius of curvature 304. For example, the forward edge 302 may have a radius of curvature 304 of less than approximately of 0.010 inch when the forward edge 302 is viewed in side cross-section. However, in other examples, the forward edge 302 may be relatively sharp with a radius of curvature 304 of less than 0.003 inch. A relatively sharp radius of curvature 304 may promote the generation of relatively strong vortices 400 as the local flow 122 flows over the forward edges 302. The radius of curvature 304 of the forward edge 302 may be generally constant along the length of each a forward edge. However, in some examples, the radius of curvature 304 may vary along the length of the forward edge 302.

Figure 10:
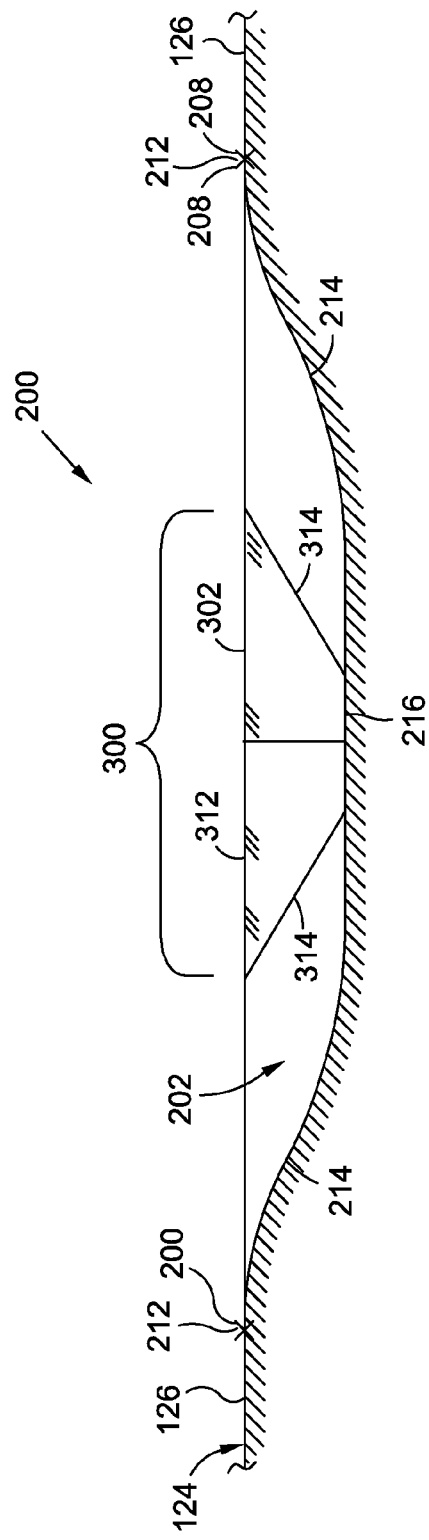
FIG. 10 is a transverse sectional view of the submerged vortex generator taken along line 10 of FIG. 6 and illustrating the leading edge upper surface positioned at or below the tangent line of the aerodynamic surface.

FIG. 10 is a transverse sectional view of the submerged vortex generator 200 illustrating the leading edge upper surface 312 positioned at or below the tangent line 210 of the aerodynamic surface 126. Also shown are the leading edge lower surfaces 314 of the vortex generator leading edge 300. The opposing sides of the depression 202 may each include a depression transition section 214 which may be tangent to and continuous with the aerodynamic surface 126. The depression transition sections 214 may smoothly transition the aerodynamic surface 126 into the depression base 216. Although the depression base 216 is shown as having a generally flat or planar shape, the depression 202 may be continuously curved between the opposing sides and opposing forward and aft ends of the depression 202.

FIGS. 11-12 show an example of a submerged vortex generator 200 including a vortex generator leading edge 300 having a leading edge upper surface 312 oriented at an angle of incidence 318 at the forward-most location 326 on the vortex generator leading edge 300 relative to the tangent line 210. The angle of incidence 318 may also be described in the present disclosure as the angle between a tangent (not shown) to the leading edge upper surface 312 at the forward-most location 326 of the vortex generator leading edge 300, and a tangent (not shown) to an imaginary outer mold line (not shown) at the forward-most location 326. In some examples, the vortex generator leading edge 300 may be oriented at an angle of incidence 318 of up to approximately positive 45 degrees relative to the tangent line 210. In the example shown, the angle of incidence 318 may be in the range of from approximately 5-30 degrees. Orienting the leading edge upper surfaces 312 at an angle of incidence 318 relative to the tangent line 210 or outer mold line may result in the generation of strong vortices 400 relative to the vortices 400 generated by a leading edge upper surface 312 that is generally parallel to the tangent line 210.

FIG. 13 is a top view of the submerged vortex generator 200 of FIGS. 11-12. The vortex generator has a v-shaped structure 320 defined by the forward edges 302 which meet at the forward-most location 326 or apex of the vortex generator leading edge 300. Although shown as being generally straight, each one of the forward edges 302 may be slightly curved as indicated above. Each one of the forward edges 302 may extend from the apex and may terminate at the depression transition section 214 on the aft portion 206 of the depression 202.

FIG. 14 is a side sectional view of the submerged vortex generator 200 showing the leading edge upper surface 312 oriented at the angle of incidence 318 relative to the tangent line 210. The forward edge 302 may be positioned at or below the tangent line 210 to the aerodynamic surface 126 upstream of the depression 202. The leading edge upper surface 312 may be generally concave and may include a smooth transition to the aerodynamic surface 126 aft of the vortex generator leading edge 300.

FIG. 15 shows a further example of a submerged vortex generator 200 including a vortex generator leading edge 300 having a reverse v-shaped structure 322. The reverse v-shaped structure 322 may include a pair of forward edges 302 that have aft ends that converge at a vertex located at an aft portion 206 of the depression 202. However, in an example not shown, the reverse v-shaped structure 322 may be configured such that the aft ends of the forward edges 302 terminate in laterally spaced relation to one another. In FIG. 15, the leading edge upper surface 312 of each one of the forward edges 302 may be generally continuous or tangent with the aerodynamic surface 126. However, in other examples, one or both of the forward edges 302 may be configured such that the leading edge upper surface 312 is oriented at an angle of incidence 318 relative to the tangent line 210. In this regard, the leading edge upper surface 312 of one or both of the forward edges 302 may be shaped similar to the leading edge upper surface 312 shown in FIG. 14.

In some examples, the leading edge lower surfaces 314 may converge at a point such that the depression 202 has little or no depth at the aft-most end of the depression 202 as shown in FIG. 15. However, in an example not shown, the depression transition section 214 may be omitted from the aft portion 206 of the depression 202, and the depression base 216 may continue at a substantially constant depression depth 224 toward the aft-most end of the depression 202. In this regard, the leading edge lower surfaces 314 may converge at an approximately vertical line (not shown) at the aft-most end of the depression 202.

FIG. 16 is a top view of the submerged vortex generator 200 of FIG. 15 showing a pair of counter-rotating vortices 402 generated by the reverse v-shaped structure 322. The counter-rotating vortices 402 generated by the reverse v-shaped structure 322 of FIG. 16 may rotate in opposite direction to the counter-rotating vortices 402 generated by the v-shaped structure 320 of FIGS. 4-14. In addition, the counter-rotating vortices 402 generated by the reverse v-shaped structure 322 of FIG. 16 may both emanate from a common location at the vertex of the forward edges 302, in contrast to separate locations from which the vortices 400 emanate from the v-shaped structure 320 of FIGS. 4-14. The included angle 316 between the leading edge upper surface 312 and the leading edge lower surface 314 for each one of the forward edges 302 may be less than 90 degrees. For example, the included angle 316 for one or both of the forward edges 302 may be in the range of from approximately 30-60 degrees.

In FIGS. 15-16, the forward edges 302 of the reverse v-shaped structure 322 may define a sweep angle 324 of between approximately 30-180 degrees. The depression 202 may be shaped and configured similar to the depression 202 illustrated in FIGS. 4 and 11. In the example shown, the depression 202 may include a depression transition section 214 at a forward portion 204 of the depression 202 to smoothly transition from the local flow 122 from the aerodynamic surface 126 into the depression 202. An aft portion 206 of the depression 202 may also include a depression transition section 214 and which may also be tangent to the aerodynamic surface 126 at an aft-most portion of the depression 202. However, as indicated above, the depression transition section 214 may be omitted from the aft portion 206 of the depression 202, and the depression base 216 may continue at a substantially constant depression depth 224 such that the leading edge lower surfaces 314 converge at an approximately vertical line (not shown).

FIGS. 17-18 show an example of a submerged vortex generator 200 including a vortex generator leading edge 300 configured in a reverse v-shaped structure 322 having a forward edge 302 and an aft edge 306. The vortex generator leading edge 300 may be located in a mid-aft portion 206 of the depression 202 (e.g., in the depression base 216) relative to the direction of local flow 122. The vortex generator leading edge 300 may have a leading edge upper surface 312 that may be located at or below the tangent line 210 and/or imaginary outer mold line of the aerodynamic surface 126, similar to the submerged vortex generator 200 configurations described above. For the forward edges 302, the included angle 316 between the leading edge upper surface 312 and the leading edge lower surface 314 may be less than 90 degrees. Similarly, for the aft edges 306, the included angle 316 between the leading edge upper surface 312 and the leading edge lower surface 314 may be less than 90 degrees. The forward edges 302 are shown as being generally straight. In contrast, the aft edges 306 may include a slight curve near the vertex of the aft edges 306. The submerged vortex generator 200 of FIG. 17 may generate a pair of counter-rotating vortices 402 generated similar to the vortices 402 generated by the example of FIGS. 15-16.

FIGS. 19-20 show an example of a submerged vortex generator 200 including a vortex generator leading edge 300 having a single-edge structure 328 which may generate a single vortex 400. The vortex generator leading edge 300 may include a single forward edge 302 which may be oriented at any angle of between 0-90 degrees relative to the local flow 122 direction. The forward edge 302 may be generally straight as shown. However, the forward edge 302 may include a slight curve (not shown) along at least a portion of the forward edge 302, and/or the forward edge 302 may include two or more straight sections (not shown) oriented at a slight angle relative to one another. The forward edge 302 may be oriented non-parallel to the local flow 122 direction such as at an angle of between approximately 10-80 degrees relative to the local flow 122 direction. The depression 202 may be configured similar to that which is described above for the depression 202 shown in FIGS. 15-16. In addition, the leading edge upper surface 312 may be continuous with the shape of the aerodynamic surface 126. However, in an example not shown, the leading edge upper surface 312 may be oriented at an angle of incidence 318 similar to the example shown in FIG. 14.

Although not shown, a submerged vortex generator 200 may be configured to generate more than two (2) vortices 400. For example, a submerged vortex generator 200 may include multiple vortex generator leading edges (not shown) mounted in a single depression 202. In this regard, a submerged vortex generator 200 may include any number of forward edges 302, each of which may generate a distinct vortex 400 separate from vortices 400 generated by other forward edges 302 located in the same depression 202. For example, a submerged vortex generator 200 may have a w-shaped structure (not shown) with four (4) separate forward edges 302, each of which may generate a distinct vortex 400.

FIG. 21 shows an example of a submerged vortex generator 200 including door panels 350 that may be movable between a first position (e.g., an open position 358) and a second position (e.g., a closed position 360—see FIG. 26). When the door panels 350 are in the open position 358 (e.g., see FIGS. 21 and 27), the depression 202 may be exposed allowing the local flow 122 to enter the depression 202 such that the vortex generator leading edge 300 may be exposed to the local flow 122 for generating one or more vortices 400. When the door panels 350 are in the closed position 360 (FIG. 26) as may be dictated by line-of-sight requirements, the door panels 350 may cover the depression 202 which may assist in concealing and/or avoiding visual detection of the submerged vortex generator 200.

In the example shown, each one of the door panels 350 may include a hinged edge 354 and a free edge 356. Each door panel 350 may be pivotable about a hinge line 352 extending along the hinged edge 354. The shape of the free edge 356 of each door panel 350 may be configured complementary to the shape of the vortex generator leading edge 300. For example, when the door panel 350 is in the closed position 360 as shown in FIG. 26, a portion of the free edge 356 of each door panel 350 may be aligned with and/or may be in contact with a forward edge 302 of the vortex generator leading edge 300. When the door panel 350 is in the open position 358 as shown in FIGS. 23-25, a remaining portion of the free edge 356 of each door panel 350 may be in contact with and/or may seal against the depression base 216.

FIG. 22 is a side sectional view of the submerged vortex generator 200 of FIG. 21. The depression 202 may include a depression base 216 which may also serve as a depression transition section 214 for guiding the local flow 122 into the depression 202. In some examples, the depression base 216 may be ramped upwardly toward the aerodynamic surface 126 at a forward portion 204 of the submerged vortex generator 200. The ramped portion of the depression base 216 may be configured to contact or seal with the free edge 356 of each one of the door panels 350 in the open position 358 as mentioned above. The aft portion 206 of the depression 202 may include a depression ramp 218 shown as a phantom line in FIG. 22. The depression ramp 218 may be configured to contact or seal with the aft portion 206 of the free edge 356 of each one of the door panels 350 in the open position 358. In addition, the depression ramp 218 may guide the flow upwardly into the vortex generator leading edge 300. The depression ramp 218 may also guide the flow out of the depression 202.

Figure 23:
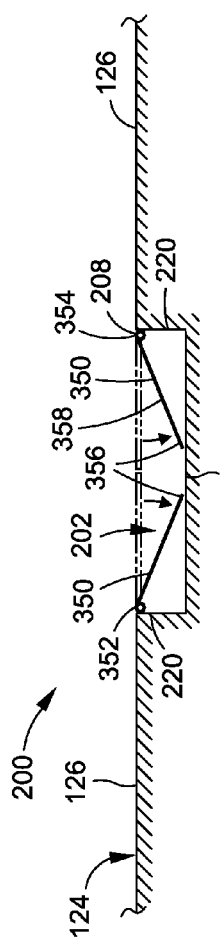
FIG. 23 is a transverse sectional view of the submerged vortex generator taken along line 23 of FIG. 21 and illustrating the door panels in the first position (e.g., open position—phantom lines) and in the second position (e.g., closed position—solid lines)
Figure 24:
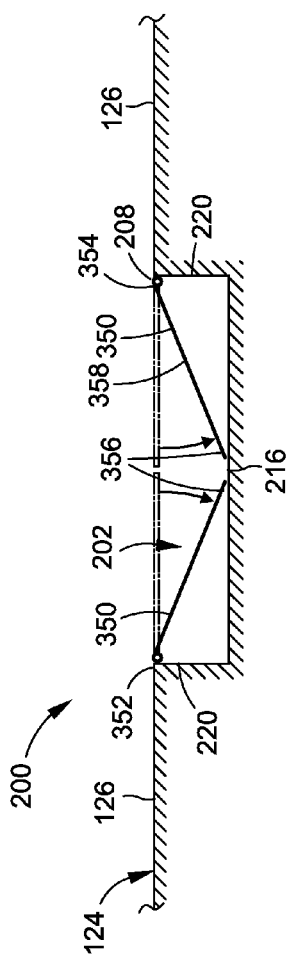
FIG. 24 is a transverse sectional view of the submerged vortex generator taken along line 24 of FIG. 21.
Figure 25:
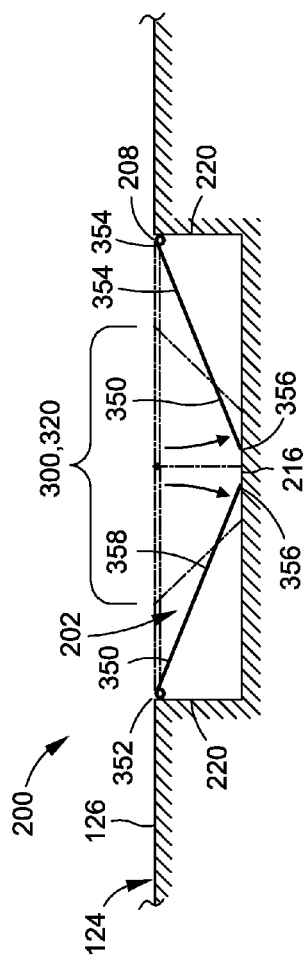
FIG. 25 is a transverse sectional view of the submerged vortex generator taken along line 25 of FIG. 21.

FIGS. 23-25 are transverse sectional views of the submerged vortex generator 200 illustrating the depression 202 formed in a substructure, and further illustrating door panels 350 in the open position 358 with the free edges 356 in contact with the depression base 216. The depression 202 may be formed into a substructure of an aircraft or other vehicle, and may be bounded by a depression base 216 and an opposing pair of depression side walls 220. In the open position 358, the door panels 350 may be oriented at a non-perpendicular angle relative to a tangent to the aerodynamic surfaces 126. In this regard, the door panels 350 may function as part of the depression transition section 214 for smoothly guiding the local flow 122 into the depression 202 in a manner avoiding a reduction in the velocity of the local flow 122 and avoiding flow separation within the depression 202. Although not shown, the door panels 350 may be movable between the open position 358 and the closed position 360 by one or more actuators (not shown) such as an electromechanical actuator, a hydraulic actuator, or other type of actuator.

FIGS. 26-27 are top views of the submerged vortex generator 200 of FIG. 21 with the door panels 350 in the closed position 360 (FIG. 26) and the open position 358 (FIG. 27). In the closed position 360, the door panels 350 may be generally flush or continuous with the outer mold line of the aerodynamic surface 126 surrounding the depression 202. In this regard, the door panels 350 in the closed position 360 (FIG. 26) may restore the outer mold line of the aerodynamic surface 126 over the depression 202 which may reduce aerodynamic drag otherwise generated when the depression 202 is exposed. In the open position 358 shown in FIG. 27, the vortex generator leading edge 300 may be exposed to the local flow 122 and may generate one or more vortices 400.

Although FIGS. 21-27 show the door panels 350 applied to a v-shaped 320 vortex generator 200, one or more door panels 350 may be implemented on any configuration of submerged vortex generator 200. Furthermore, the configuration of the door panels 350 is not limited to an opposing pair of hinged doors, and may include a flexible shield (not shown) and/or a sliding panel (not shown) for selectively exposing and covering the depression 202 and/or vortex generator leading edge 300, or a door may be provided in any one of a variety of other door configurations, without limitation.

In any of the examples disclosed herein, the submerged vortex generator 200 may be configured to generate a relatively small amount of aerodynamic drag under conditions when the submerged vortex generator 200 generates vortices 400, and also under conditions when the submerged vortex generator 200 is not generating vortices 400, such as when the submerged vortex generator 200 is non-exposed to oncoming flow due to the movable door panels 350 covering the depression 202 (e.g., see FIG. 26), or due to the submerged vortex generator 200 being hidden or non-exposed to oncoming flow during certain flight conditions (e.g., see FIGS. 28-32). An additional property of the submerged vortex generator 200 is that the submerged nature of the vortex generator leading edge 300 may prevent the vortex generator leading edge 300 from being struck by an object and broken off as may occur with conventional vortex generators that protrude above the outer mold line of a surface. For applications wherein the submerged vortex generator 200 is used on a marine vessel that may travel through seaweed or debris, the submerged nature of the vortex generator leading edge 300 may prevent the vortex generator leading edge 300 from catching or collecting seaweed or being struck by debris as may occur with conventional protruding vortex generators.

FIG. 28 is a sectional view of a wing 132 and a trailing edge flap 138 mounted to the wing 132. Although shown as being implemented on a trailing edge flap 138, one or more submerged vortex generators 200 may be mounted on any type of aerodynamic body 124. For example, one or more submerged vortex generators 200 may be mounted on a wing 132, a fuselage 106 (e.g., see FIGS. 2-3), and/or a control surface of an aircraft 102 such as a wing leading edge device (e.g., a Krueger flap, a leading edge slat, etc.), or on a vertical fin or rudder, or a horizontal stabilizer or elevator. In some examples, one or more submerged vortex generators 200 may be located on an aerodynamic body leading edge 128 (e.g., FIGS. 29-32) and/or an aerodynamic body trailing edge (not shown).

Figure 32:
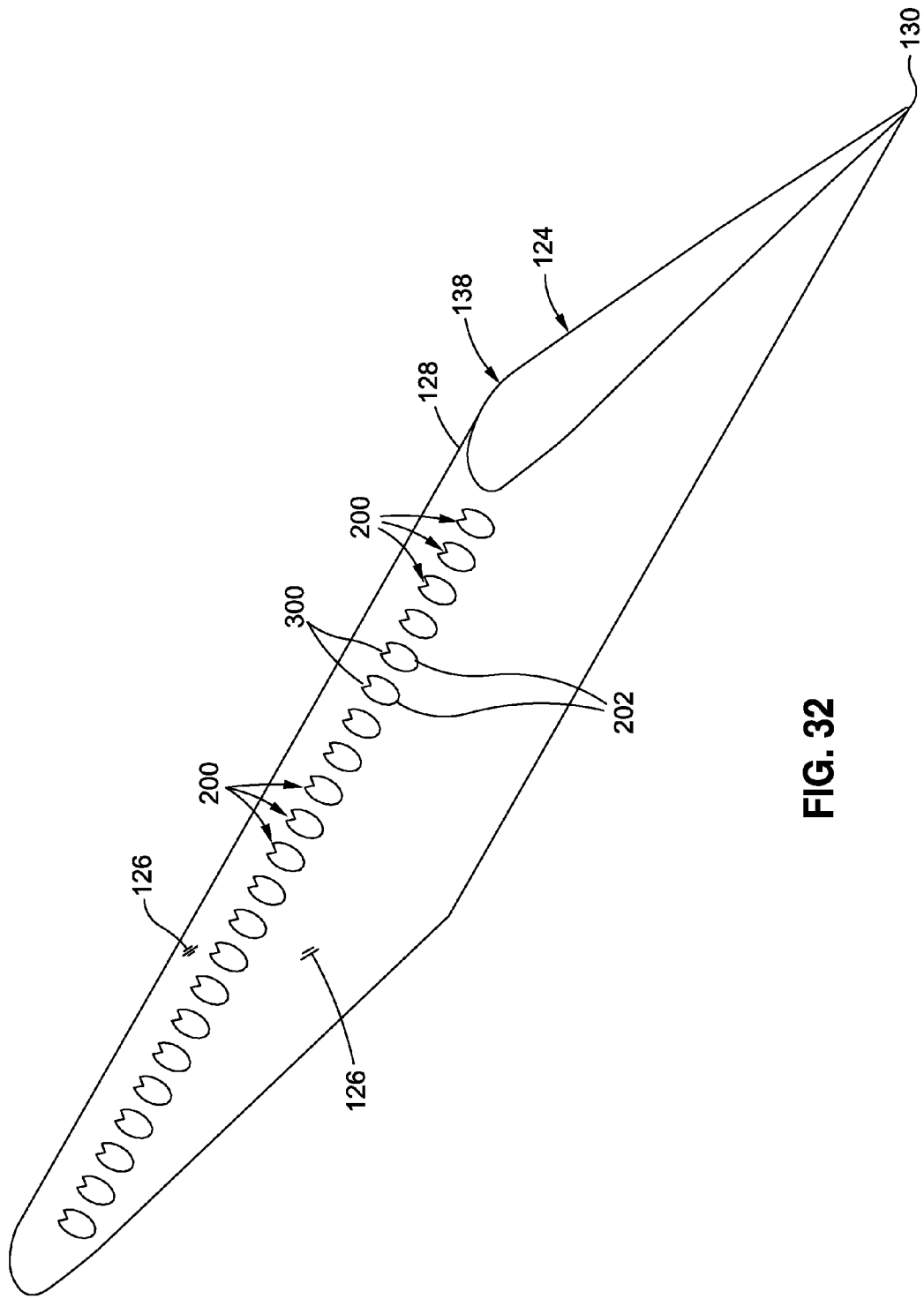
FIG. 32 is a perspective view of an example of a plurality of vortex generators mounted on a trailing edge flap.

FIG. 29 is a sectional view of a wing 132 including a trailing edge flap 138 in a retracted position 140. The trailing edge flap 138 may include a leading edge 128 and a trailing edge 130. One or more submerged vortex generators 200 may be located on the leading edge 128 of the trailing edge flap 138. FIG. 32 shows an example of a plurality of vortex generators mounted on a lower surface of the leading edge 128 of the trailing edge flap 138. Each one of the submerged vortex generators 200 may be oriented such that the depression 202 is located aft of the vortex generator leading edge 300 relative to a forward-aft direction of the aircraft 102. As shown in FIG. 29, a submerged vortex generator 200 may be positioned on the flap leading edge 128 at a location such that the submerged vortex generator 200 is non-exposed to the freestream flow 120 when the trailing edge flap 138 is in a retracted position 140, and the submerged vortex generator 200 is exposed to the freestream flow 120 when the trailing edge flap 138 is in a deployed position 142 (e.g., see FIGS. 30-31).

When the trailing edge flap 138 is in the refracted position 140, the submerged vortex generator 200 may avoid generating aerodynamic drag due to non-exposure to the freestream flow 120.

FIG. 30 shows the trailing edge flap 138 in a partially-deployed position 142 such as a takeoff position 144. The submerged vortex generator 200 may be exposed to the freestream flow 120 when the trailing edge flap 138 is in the takeoff position 144. In addition, the submerged vortex generator 200 may be positioned on the flap leading edge 128 at a location such that a flow attachment line 148 of the freestream flow 120 is forward of the submerged vortex generator 200 when the trailing edge flap 138 is in the takeoff position 144. The flow attachment line 148 may be described as the general location where an oncoming freestream flow 120 impinges on an aerodynamic body 124 and diverges into local flow 122 traveling in opposite directions over the aerodynamic body 124. For example, in FIG. 30, the flow attachment line 148 is located forward of the submerged vortex generator 200 such that a portion of the local flow 122 moves upwardly and over the flap leading edge 128 and along the upper surface of the trailing edge flap 138, and a remaining portion of the local flow 122 moves downwardly over the submerged vortex generator 200 and along the lower surface of the trailing edge flap 138. Due to the orientation and location of the submerged vortex generator 200, the portion of the local flow 122 moving downwardly over the submerged vortex generator 200 may fail to generate vortices 400 that have any significant effect on energizing downstream flow.

FIG. 31 shows the trailing edge flap 138 in a further deployed position 142 such as a landing position 146. The submerged vortex generator 200 may be positioned on the flap leading edge 128 at a location such that the flow attachment line 148 is aft of the submerged vortex generator 200 when the trailing edge flap 138 is in the landing position 146. When the flow attachment line 148 is aft of the submerged vortex generator 200, a portion of the local flow 122 flows into the depression 202 and passes over the vortex generator leading edge 300 in a manner as shown in FIGS. 4-5, 11-12, and 15-21, and resulting in the generation of vortices 400 that may flow upwardly over the leading edge 128, and thereby suppress the tendency for the flow to separate over the upper surface of the trailing edge flap 138.

Figure 33:
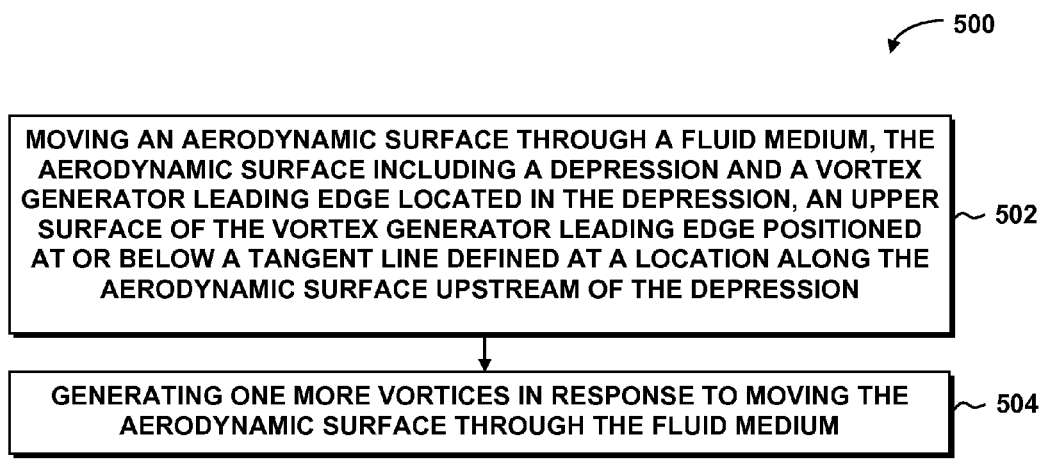
FIG. 33 is a flowchart illustrating one or more operations that may be included in a method of generating vortices.

FIG. 33 is a flowchart illustrating one or more operations that may be included in a method 500 of generating vortices 400. The method may include step 502 which may include moving an aerodynamic surface 126 through a fluid medium. In an example, the aerodynamic surface 126 may be an aerodynamic surface 126 of an aircraft 102 in subsonic flight through a fluid medium of air. As indicated above, the aircraft 102 may include one or more submerged vortex generators 200, each including a depression 202 and a vortex generator leading edge 300 located in the depression 202. The subsonic flow may flow over the aerodynamic surface 126 of the aircraft 102 and may enter the depression 202 of the submerged vortex generator 200. Due to the shape and configuration of the depression 202, the oncoming local flow 122 (e.g., the subsonic flow) of the fluid medium may be maintained in a laminar state when the fluid medium flows into the depression 202.

Step 504 of the method 500 may include generating one more vortices 400 in response to moving the aerodynamic surface 126 through the air. The vortices 400 may be generated as a result of the local flow 122 flowing into the depression 202 and over the vortex generator leading edge 300, as shown in FIGS. 4-5, 11-12, and 15-21. For example, for a submerged vortex generator 200 having a v-shaped structure 320 or a reversed v-shaped structure 322 as shown in FIGS. 4-5, 11-12, and 15-18, a pair of counter-rotating vortices 402 may be generated. For a submerged vortex generator 200 configured as a single-edge structure 328, a single vortex 400 may be generated. The vortex 400 or vortices 400 may facilitate the energization of relatively low-momentum flow by mixing the low-momentum flow (e.g., the boundary layer flow or local flow 122—FIG. 3) with high-momentum flow (e.g., the freestream flow 120—FIG. 2). The energization of the flow may reduce or avoid flow separation which may result in a reduction in aerodynamic drag, an increase in aerodynamic lift, an increase in lift coefficient, and other performance improvements.

In some example, the method may include moving one or more door panels 350 (e.g., see FIGS. 21-27) between a closed position 360 and an open position 358 to selectively cover or expose the depression 202 and/or vortex generator leading edge 300. As indicated above, a submerged vortex generator 200 may be provided with one or more door panels 350 for applications or conditions where line-of-sight requirements may be imposed. The method may include moving the one or more door panels 350 to the open position 358 to expose the vortex generator leading edge 300 to local flow 122 so that one or more vortices 400 may be generated. The method may additionally include moving the one or more door panels 350 to the closed position 360 to conceal the depression 202 and/or vortex generator leading edge 300.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A vortex generator, comprising:
   a depression in an aerodynamic surface of a vehicle movable through an oncoming freestream flow;
   a vortex generator leading edge located in the depression and including a leading edge upper surface;
   the leading edge upper surface positioned at or below a tangent line defined by a perimeter of the depression; and
   the vortex generator leading edge generating at least one vortex extending along a direction generally parallel to the freestream flow and an oncoming local flow when the vortex is viewed along a direction normal to the aerodynamic surface.

2. The vortex generator of claim 1, wherein:
   a forward edge of the vortex generator leading edge is oriented at an angle relative to an oncoming local flow when viewed along a direction normal to the leading edge upper surface.

3. The vortex generator of claim 1, wherein:
   the vortex generator leading edge comprises a v-shaped structure when viewed along a direction normal to the leading edge upper surface.

4. The vortex generator of claim 3, wherein:
   the vortex generator leading edge defines a sweep angle of between approximately 30-180 degrees.

5. The vortex generator of claim 3, wherein:
   the vortex generator leading edge is configured to generate a pair of counter-rotating vortices.

6. The vortex generator of claim 1, wherein:
   the vortex generator leading edge is oriented at an angle of incidence of up to approximately positive 45 degrees relative to the tangent line.

7. The vortex generator of claim 1, wherein:
   the vortex generator leading edge includes a leading edge lower surface and an included angle of less than 90 degrees between the leading edge upper and lower surface.

8. The vortex generator of claim 1, wherein:
   the leading edge includes a forward edge having a radius of curvature of less than approximately of 0.010 inch when the forward edge is viewed in side cross-section.

9. The vortex generator of claim 1, wherein:
   a forward portion of the depression forms a smooth, continuous depression transition section from the aerodynamic surface upstream of the depression to a depression base.

10. The vortex generator of claim 1, wherein:
    the depression has a depression length that is in a range of from approximately 2 to 10 times a leading edge length.

11. The vortex generator of claim 1, wherein:
    the depression has an aspect ratio of depression length to depression depth of between approximately 1:1 and 25:1.

12. The vortex generator of claim 1, further including:
    one or more door panels movable between a first position in which the depression and the vortex generator leading edge are exposed to the oncoming local flow and a second position in which the one or more door panels covers at least the depression.

13. An aircraft, including:
    an aerodynamic body having an aerodynamic surface and movable through an oncoming freestream flow; and
    a vortex generator formed in the aerodynamic body and including:
      a depression in the aerodynamic surface;
      a vortex generator leading edge located in the depression and including a leading edge upper surface positioned at or below a tangent line defined by a perimeter of the depression; and
      the vortex generator leading edge generating at least one vortex extending along a direction generally parallel to the freestream flow and an oncoming local flow when the vortex is viewed along a direction normal to the aerodynamic surface.

14. The aircraft of claim 13, wherein:
    the aerodynamic body is at least one of a wing and a control surface, the aerodynamic body having an aerodynamic body leading edge and/or an aerodynamic body trailing edge; and
    the vortex generator is located on the leading edge and/or trailing edge of the aerodynamic body.

15. The aircraft of claim 13, wherein:
    the aerodynamic body is a trailing edge flap including a flap leading edge; and
    the vortex generator is positioned on the flap leading edge at a location such that the vortex generator is non-exposed to a freestream flow when the trailing edge flap is in a retracted position and such that the vortex generator is exposed to the freestream flow when the trailing edge flap is in a deployed position.

16. The aircraft of claim 13, wherein:
    a depth of the depression is between approximately 1-5 times a boundary layer displacement thickness.

17. A method of generating vortices, comprising:
    moving an aerodynamic surface through an oncoming freestream flow of a fluid medium, the aerodynamic surface including a depression and a vortex generator leading edge located in the depression, an upper surface of the vortex generator leading edge positioned at or below a tangent line defined by a perimeter of the depression; and generating one more vortices in response to moving the aerodynamic surface through the fluid medium, the one or more vortices extending along a direction generally parallel to the freestream flow and an oncoming local flow when the one or more vortices are viewed along a direction normal to the aerodynamic surface.

18. The method of claim 17, wherein the vortex generator leading edge includes a v-shaped structure, the step of generating one or more vortices comprising:

generating a pair of counter-rotating vortices.

19. The method of claim 17, wherein the step of moving the aerodynamic surface through the fluid medium comprises:

passing a subsonic flow over the aerodynamic surface and into the depression.

20. The method of claim 17, further including:

maintaining the oncoming local flow of the fluid medium in a laminar state when passing the fluid medium into the depression.

21. The method of claim 17, further comprising:

moving one or more door panels between a closed position and an open position; and exposing the vortex generator leading edge to local flow in response to moving the one or more door panels to the open position.

* * * * *